United States Patent
Tian et al.

(10) Patent No.: US 11,954,097 B2
(45) Date of Patent: Apr. 9, 2024

(54) INTELLIGENT KNOWLEDGE-LEARNING AND QUESTION-ANSWERING

(71) Applicant: Microsoft Technology Licensing, LLC, Redmond, WA (US)

(72) Inventors: Yang Tian, Redmond, WA (US); Jianyong Wang, Redmond, WA (US); Peng Chen, Redmond, WA (US); Wei Wang, Redmond, WA (US); Ting Sun, Redmond, WA (US); Jie Zhang, Dongcheng District (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 749 days.

(21) Appl. No.: 16/975,373

(22) PCT Filed: Feb. 27, 2019

(86) PCT No.: PCT/US2019/019696
§ 371 (c)(1),
(2) Date: Aug. 24, 2020

(87) PCT Pub. No.: WO2019/173085
PCT Pub. Date: Sep. 12, 2019

(65) Prior Publication Data
US 2020/0394185 A1 Dec. 17, 2020

(30) Foreign Application Priority Data

Mar. 6, 2018 (CN) .......................... 201810185049.7

(51) Int. Cl.
| | |
|---|---|
| G06F 16/242 | (2019.01) |
| G06F 40/211 | (2020.01) |
| G06F 40/284 | (2020.01) |
| G06F 40/35 | (2020.01) |
| G06N 3/08 | (2023.01) |
| G06N 5/022 | (2023.01) |

(52) U.S. Cl.
CPC ........ *G06F 16/2428* (2019.01); *G06F 40/211* (2020.01); *G06F 40/284* (2020.01); *G06F 40/35* (2020.01); *G06N 3/08* (2013.01); *G06N 5/022* (2013.01)

(58) Field of Classification Search
CPC ....................................... G06F 16/245–24528
See application file for complete search history.

(56) References Cited

U.S. PATENT DOCUMENTS

| | | |
|---|---|---|
| 7,454,430 B1 | 11/2008 | Komissarchik et al. |
| 7,739,215 B2 | 6/2010 | Horvitz et al. |
| 9,092,802 B1 | 7/2015 | Akella |

(Continued)

FOREIGN PATENT DOCUMENTS

| | | |
|---|---|---|
| CN | 107748757 A | 3/2018 |
| WO | 2018029696 A1 | 2/2018 |

OTHER PUBLICATIONS

Grishman, et al., "Isolating Domain Dependencies in Natural Language Interfaces", In Proceedings of the 1st Conference on Applied Natural Language Processing, Feb. 1, 1983, pp. 46-53.

(Continued)

*Primary Examiner* — Robert W Beausoliel, Jr.
*Assistant Examiner* — Nirav K Khakhar
(74) *Attorney, Agent, or Firm* — Schwegman Lundberg & Woessner, P.A.

(57) ABSTRACT

The present disclosure provides a technical solution related to intelligent knowledge learning and question-answering. The technical solution involves extracting knowledge from corpus and providing a user with a question-answering service based on the extracted knowledge.

15 Claims, 13 Drawing Sheets

(56) References Cited

U.S. PATENT DOCUMENTS

| | | |
|---|---|---|
| 9,110,882 B2 | 8/2015 | Overell et al. |
| 9,369,410 B2 | 6/2016 | Westwood et al. |
| 9,703,861 B2 | 7/2017 | Brown et al. |
| 2013/0066818 A1 | 3/2013 | Assadollahi et al. |
| 2013/0226846 A1 | 8/2013 | Li et al. |
| 2015/0339577 A1 | 11/2015 | Waltinger |
| 2021/0200762 A1* | 7/2021 | Trummer .............. G06F 40/205 |

OTHER PUBLICATIONS

Kumar, et al., "Constructing Knowledge Graph from Unstructured Text", Retrieved From: https://web.archive.org/web/20161213094852/http:/home.iitk.ac.in/~kundan/report_365.pdf, Dec. 13, 2016, 17 Pages.

"International Search Report and Written Opinion Issued in PCT Application No. PCT/US19/019696", dated Aug. 29, 2019, 18 Pages.

Xie, et al., "Topic Enhanced Deep Structured Semantic Models for Knowledge Base Question Answering", In Journal of Science China Information Sciences, vol. 60, Issue 11, Nov. 2017, 15 Pages.

"Office Action and Search Report Issued in Chinese Patent Application No. 201810185049.7", dated Dec. 1, 2022, 13 Pages.

"Office Action Issued in Chinese Patent Application No. 201810185049.7", dated Aug. 28, 2023, 11 Pages.

"Second Office Action Issued in Chinese Patent Application No. 201810185049.7", dated Jun. 1, 2023, 13 Pages.

"Invitation to Pay Additional Fee Issued in PCT Application No. PCT/US19/019696", Mailed Date: May 20, 2019, 14 Pages.

"Office Action Issued in European Patent Application No. 19710553.9", dated Jul. 13, 2023, 8 Pages.

* cited by examiner

INTELLIGENT KNOWLEDGE-LEARNING AND QUESTION-ANSWERING

CROSS-REFERENCE TO RELATED APPLICATION

This application is a U.S. National Stage Filing under 35 U.S.C. 371 of International Patent Application Serial No. PCT/US2019/019696, filed Feb. 27, 2019, and published as WO 2019/173085 A1 on Sep. 12, 2019, which claims priority to Chinese Application No. 201810185049.7 filed Mar. 6, 2018; which applications and publication are incorporated herein by reference in their entirety.

BACKGROUND

With the development of artificial intelligence technology, intelligent robots are widely used in all kinds of operating systems, providing users with all kinds of auxiliary operations, and being able to communicate with users on some level. The communication with the intelligent robots has also become an important channel for users to acquire various knowledge and information. Therefore, it is required that the intelligent robots may acquire knowledge better and provide users with knowledge as needed more accurately and comprehensively.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

The present disclosure is related to intelligent knowledge-learning and question-answering, involving extracting knowledge from corpus and providing a user with a question-answering service based on the extracted knowledge.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
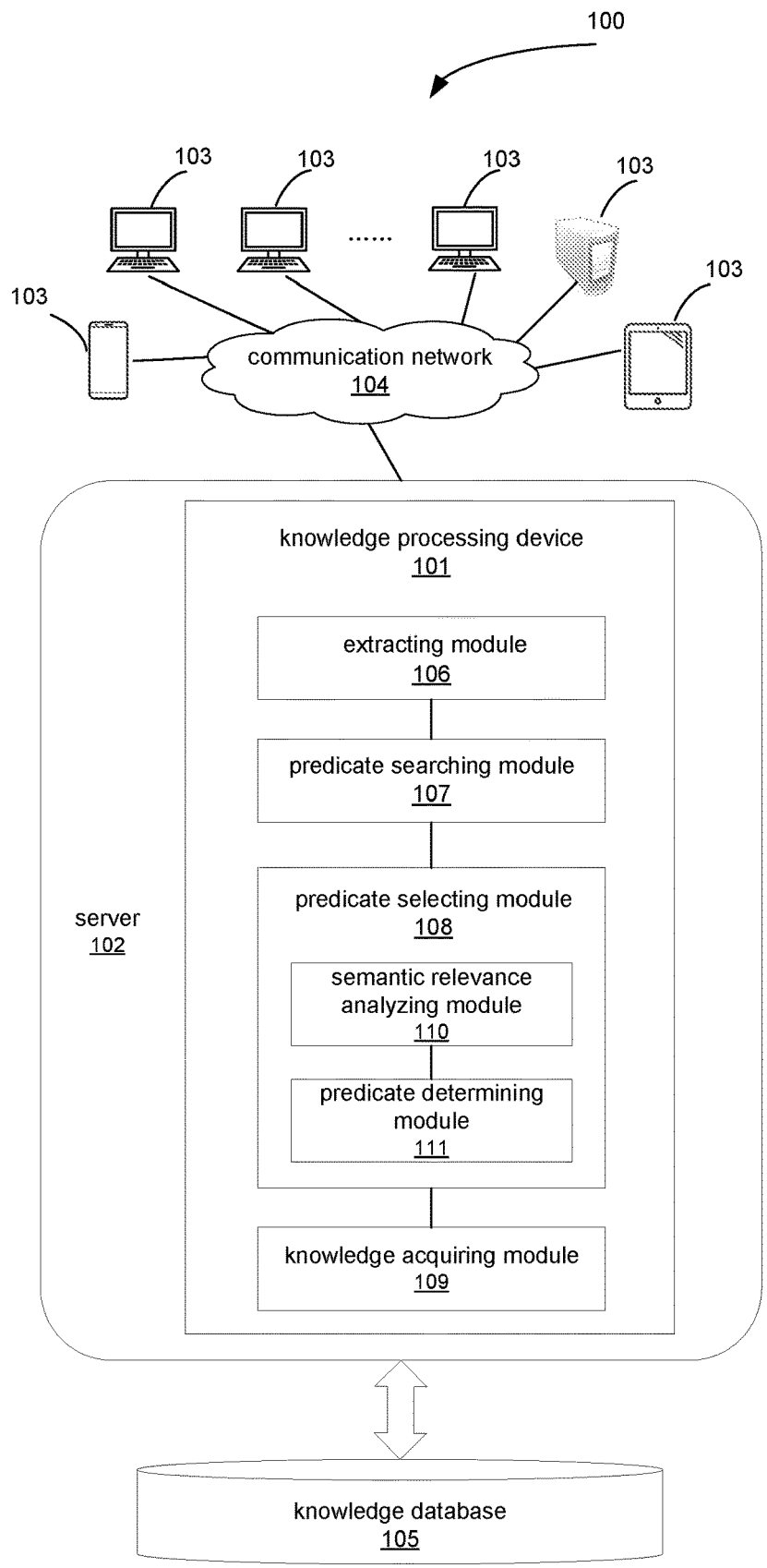
FIG. 1 is a schematic block diagram showing a knowledge processing device according to embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

In a current knowledge database system, knowledge may be in various forms. Some common forms knowledge may be paragraphs, sentences (which may be regarded as a special form of paragraphs), triples, question-answer pairs (QA pairs), tables, etc.

More particularly, the knowledge in the form of triple is widely used. A triple may be an information fragment stored in a subject-verb-object format. A triple may be used to describe anything, and relationships among tasks, spaces, institutions and other entities may be inferred based on the triples. The triple in the present disclosure may use a definition as follows: a triple includes an entity (subject), a predicate (verb), and an attribute (object).

The entity in a triple may be regarded as a concept or topic involved in a knowledge database, which may be used as an object directly described or explained by a knowledge point. The predicate in a triple may be a word that describes the relationship between an entity and an attribute. The attribute in a triple describes entity features or content-related content.

Query Processing on the Knowledge in the Form of Triple

In the prior art, the query processing on the knowledge in the form of triple may be as follows: performing segmentation on a user's query and extracting an entity and a predicate therefrom after a user's query is input; expanding the extracted predicate, and listing possible variants of the predicate, wherein the expanding the extracted predicate herein may be as follows: acquiring a predicate expanding based on a preset deformation rule of predicates or a dictionary of deformations of predicates; and retrieving knowledge in the knowledge database based on the predicate in the user's query, possible predicate deformations and the entity in the user's query. If there is a triple corresponding to the predicate in the user's query or the predicate deformations in the knowledge database, the triple may be extracted as a searching result to be provided to the user, and if there is no triple corresponding to the predicate in the user's query or the predicate deformations in the knowledge database, a null may be returned to the user as the searching result.

In the above processing procedure, because the predicate deformations are obtained according to the preset rules or an dictionary, the predicate deformations obtained substantially are very limited in number; and there is great uncertainty in the content of the user's query, and there will be many variations in a language used by the user, and thus it may be difficult to find a predicate deformation that matches well. Therefore, there may likely be cases that no searching result is found or the searching result is undesired due to the limitation of the predicate deformations. Furthermore, the processing of retrieving knowledge based on the predicate deformations does not understand the user's query in a semantic view, and thus, there may be cases that the searching results do not match a purpose of the user's query or do not match a purpose of the user's query well.

Considering the above situation, the embodiments of the disclosure provide a knowledge processing method and device. More particularly, in a query processing on the knowledge in the form of triple, the processing on predicates is improved. In the embodiments of the present disclosure, retrieving all predicates related to an entity in a user's query in a knowledge database according to the entity in the user's query and then determining the correlation between these predicates and the predicate in the user's query so as to select preferable predicates therefrom and finally acquiring knowledge, instead of performing the expanding on predicates based on a preset deformation rules of predicates or a dictionary of deformations of predicates.

Through the above processing, processing on predicates is no longer constrained by the preset rules and the limited dictionary of deformations of predicates, so that the flexibility and comprehensiveness of knowledge query are improved and knowledge more matching the intent of a user's query may be found.

Detailed description on technical solutions of the knowledge processing method and device may be made below.

As shown in FIG. 1, which is a schematic block diagram 100 showing a knowledge processing device according to embodiments of the present disclosure, the knowledge processing device 101 may be configured to provide a searching service for providing users with knowledge in a form of triple. The knowledge processing device 101 in FIG. 1 may implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The knowledge processing device 101 may be also implemented or provided in a personal computer including configurations of laptop computer and non-laptop computer. Furthermore, the knowledge processing device 101 may be further implemented as a server on internet or provided in a server on internet. Such server may be implemented in one or more computer systems (distributed server), or implemented as a server based on cloud technology or provided in a server based on cloud technology, which may be connected with a user terminal via a communication network to provide users with searching service of knowledge based on cloud.

As an example, the knowledge processing device 101 shown in FIG. 1 is provided in a server 102. The server 102 is connected with a user terminal 103 via a communication network 104. The user terminal 103 sends a user's query to the server 102 via the communication network 104. After receiving the user's query sent by the user terminal 103, the server 102 sends the user's query to the knowledge processing device 101. The knowledge processing device 101 may generate a searching result and return the generated searching result to the user terminal 103 via the communication network 104. The knowledge database 105 involved in the embodiments of the present disclosure may be stored in a local storage medium of the server 102 or stored in another server or database connected with the server 102. More particularly, the server or database storing the knowledge database may be a distributed server or database, or may be a server or database based on a cloud architecture. The server 102 as described above may be a server for supporting an intelligent chatting function of a chatbot, and the processing device 101 as described above may be embedded in a processing module of the chatbot or be used as a program module in communication connection with the chatbot. The server 102 may be a searching server for providing a searching service, and the searching server is used for providing knowledge to the user terminal 103.

The knowledge processing device 101 according to the embodiments of the present disclosure may include an extracting module 106, a predicate searching module 107, a predicate selecting module 108 and a knowledge acquiring module 109.

The extracting module 106 may be configured to extract an entity and a first predicate in a user's query. A general form of the user's query is a form of interrogative sentence, and the entity and the predicate are key parts in the whole user's query. An extraction method may be performed as follows: obtaining the entity and the predicate by performing segmenting on the user's query. In order to distinguish the predicate from a predicate mentioned below, the predicate herein may be referred to as "a first predicate".

The predicate searching module 107 may be configured to retrieve a plurality of second predicates matched with the entity in the knowledge database according to the entity in the user's query.

In the embodiments of the present disclosure, the second predicate is obtained by performing searching according to the entity in the user's query, instead of by performing expanding according to the first predicate. With processing of the predicate searching module, all predicates in the knowledge database that match the entity in the user's query may be found, and the subsequent predicate selecting may be performed. It is obvious that a certain proportion of predicates may be found as needed, and then the subsequent predicate selecting may be performed. In the knowledge database where the knowledge is stored in the form of triple, the storage ways of entities and predicates are relatively clear, and thus it may be easy to obtain all the predicates matched with the entity in the user's query. The predicate matched with the entity in the user's query mentioned above are the predicate in the same triple as the entity in the user's query.

The predicate selecting module 108 may be configured to calculate correlations between the first predicate and the plurality of second predicates, and performing selection on the plurality of second predicates according to the correlations to determine one or more third predicates. The correlation herein may be a correlation based on semantic analysis, which may be the correlation obtained by calculating a distance between vectors in a given semantic space after converting the predicates into word vectors. The correlation determined based on the distance between the word vectors may eliminate limitations due to preset deformation rules of predicates or a dictionary of deformations of predicates in the prior art, so as to find predicates more related with the first predicate in semantics from the perspectives of semantics and word vector space.

More particularly, the predicate selecting module 108 may further include a semantic relevance analyzing module 110 and a predicate determining module 111.

The semantic relevance analyzing module 110 may be configured to convert the first predicate and the plurality of second predicates into semantic vectors, and perform semantic relevance analysis to generate a rank of correlations and/or correlations between the plurality of second predicates and the first predicate. The semantic relevance analysis mentioned above can be performed based on a neural network model.

The predicate determining module 111 may be configured to determine one or more third predicates according to a preset correlation threshold and/or a correlation ranking selecting strategy. The third predicate may be used as a predicate for retrieving knowledge.

The knowledge acquiring module 109 may be configured to perform searching in the knowledge database based on the third predicate and the entity in the user's query to acquire knowledge.

In the above technical solution, the knowledge processing device 101 may first obtain a predicate matched with the entity in the knowledge database according to the entity in the query vector, then determine one or more predicates more correlated to the predicate in the user's query by means of semantic relevance analysis, and then obtain the knowledge. With such a knowledge processing method, the processing of matching predicate may be more flexible and comprehensive, and the knowledge related to the user's query may be found more accurately and comprehensively, so as to better meet the requirements of users.

Figure 2:
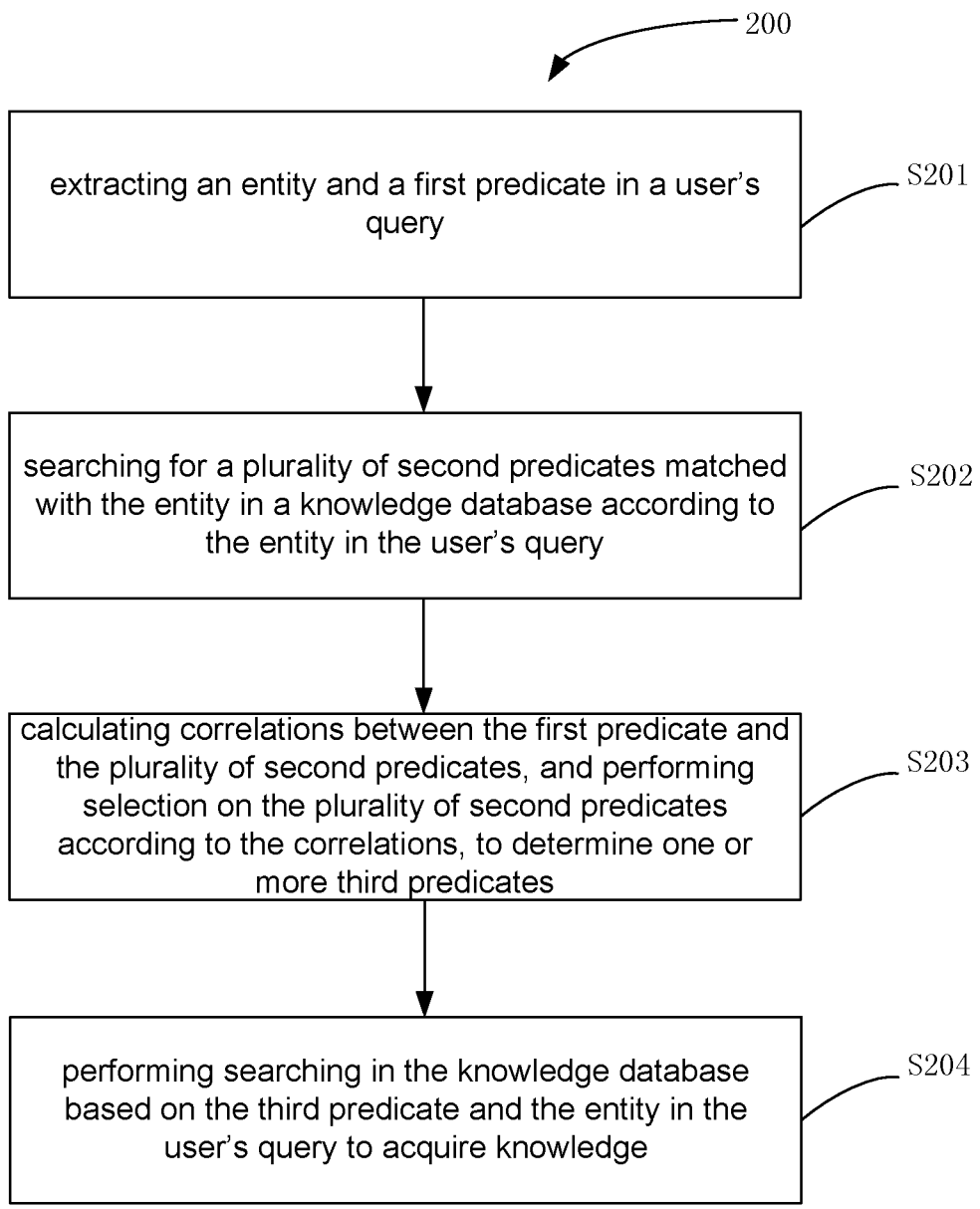
FIG. 2 is a schematic flowchart showing a knowledge processing method according to embodiments of the present disclosure.

The query processing with respect to the knowledge in the form of triple, performed by the knowledge processing device 101 shown in FIG. 1, may be as shown in FIG. 2, which is a schematic flowchart 200 showing a knowledge processing method according to embodiments of the present disclosure. The knowledge processing method may include:

S201: extracting an entity and a first predicate in a user's query. This step may be performed by the extracting module 106 described above.

S202: searching for a plurality of second predicates matched with the entity in a knowledge database according to the entity in the user's query. This step may be performed by the predicate searching module 107 described above.

S203: calculating correlations between the first predicate and the plurality of second predicates, and performing selection on the plurality of second predicates according to the correlations, to determine one or more third predicates. This step may be performed by the predicate selecting module 108 described above.

This step may further include:

S2031: converting the first predicate and the plurality of second predicates into semantic vectors, and performing semantic relevance analysis to generate a rank of correlations and/or correlations between the plurality of second predicates and the first predicate. The semantic relevance analysis in this step can be performed based on a neural network model. This step of S2031 may be performed by the semantic relevance analyzing module 110 described above.

S2032: determining one or more third predicates according to a preset correlation threshold and/or a correlation ranking selecting strategy. This step of S2032 may be performed by the predicate determining module 111 described above.

S204: performing searching in the knowledge database based on the third predicate and the entity in the user's query to acquire knowledge. This step may be performed by the knowledge acquiring module 109 described above.

Description has been made on a query processing with respect to the knowledge in the form of triple according to the embodiments of the present disclosure, and the technical details and corresponding technical effects of the query processing are described in detail in the above description on the knowledge processing device, which may be omitted herein to avoid redundancy.

Description would be made on the searching processing with respect to knowledge in the form of triple with a simple example of application.

Example of Query Processing with Respect to the Knowledge in the Form of Triple

Figure 3:
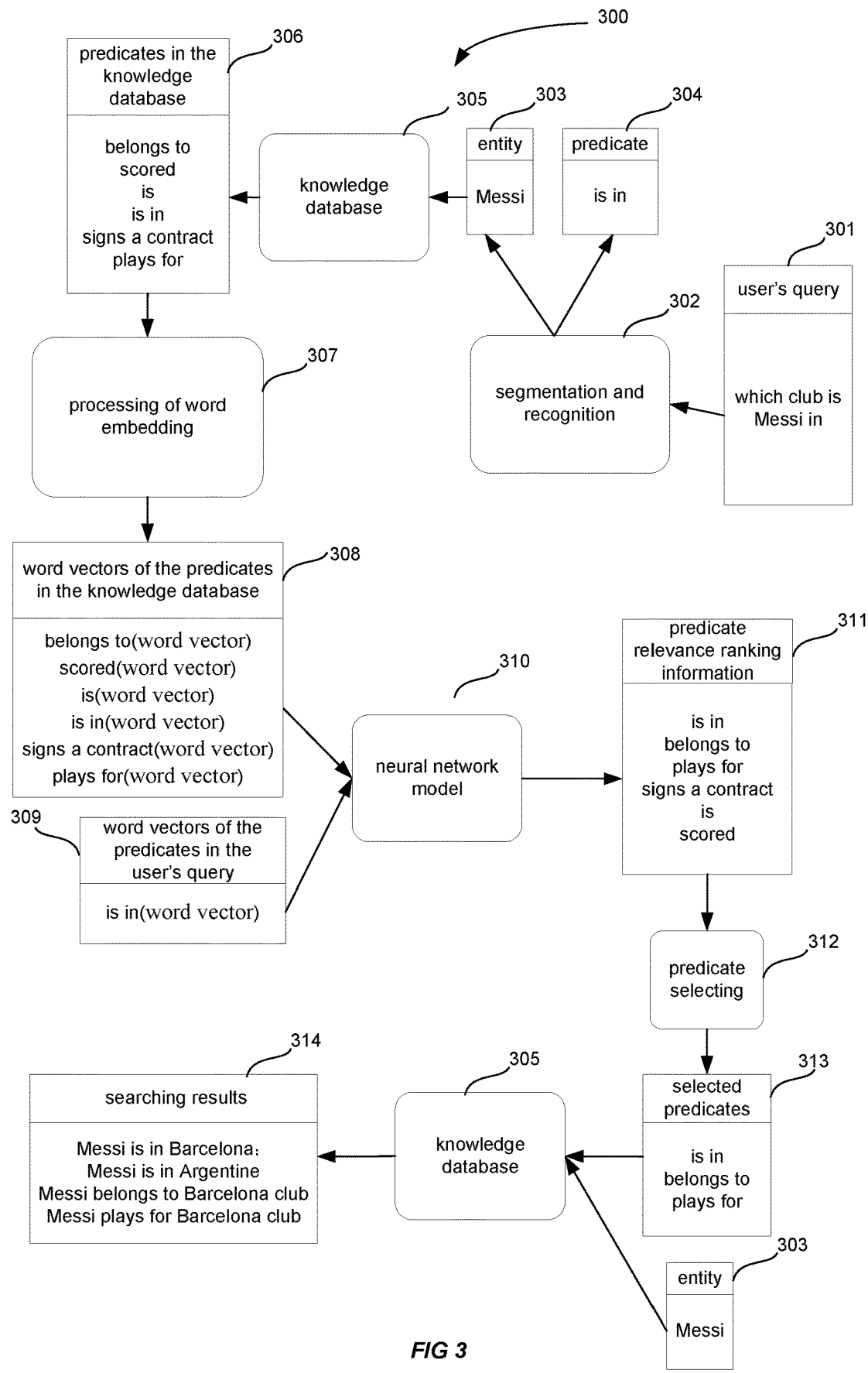
FIG. 3 is a schematic flowchart showing processing of embodiments of the present disclosure.

Description would be made on a processing according to the embodiments of the present disclosure with a user's query of "which club is Messi in" input by a user as an example. The whole processing may be as shown in FIG. 3, which is a schematic flowchart 300 showing processing of embodiments of the present disclosure.

Step a1: the user's query 301 input by the user is "which club is Messi in";

Step b1: performing segmentation and recognition on the user's query 302, and the segmentation result may be "Messi/in/which/club"; and performing recognition on the segmentation result, and an entity 303 is "Messi" and a predicate 304 is "is in".

Step c1: retrieving predicates 306 matched with "Messi" in the knowledge database 305 according to the determined entity 303 of "Messi", as shown in table 1 below, which lists predicates related to the entity of "Messi" in the knowledge database and the triples corresponding thereto:

TABLE 1

| Entity | Predicate | Example of corresponding triples in the knowledge database |
|---|---|---|
| Messi | belongs to | Messi belongs to Barcelona; |
| | scored | Messi scored 500+; |
| | | Messi scored to win the game; |
| | is | Messi is in Argentine; |
| | | Messi is the striker; |
| | | Messi is a player of Barcelona; |
| | | Messi is the Best FIFA Men's Player |
| | is in | Messi is in Barcelona; |
| | | Messi is in Spain; |
| | signs a | Messi signs a contract with Barcelona; |
| | contract | Messi signs a contract for 20 million dollars |
| | plays for | Messi plays for Barcelona; |

Step d1: performing a processing of word embedding on the predicates 306 found in the knowledge database 305 and the predicate 304 in the user's query 307, to generate word vectors (including word vectors 308 of the predicates in the knowledge database and word vectors 309 of the predicates in the user's query). Related features may be extracted in the process of generating the word vectors, and these features may be related to the context of the predicates, and thus the word vectors corresponding to "is in" in the user's query and "is in" in the knowledge database may be different word vectors.

Step e1: inputting the word vectors 308 corresponding to the predicates in the knowledge database and the word vectors 309 corresponding to the predicates in the user's query to a neural network model 310, and outputting and ranking relevance scores between the predicate "is in" in the user's query and predicates in the knowledge database, to generate predicate relevance ranking information 311, and such relevance is mainly determined by vector distances between the word vectors. It should be noted that the neural network model herein may be trained based on a large number of corpora, which at least include the current knowledge database 305.

Step f1: performing predicate selecting according to the predicate correlation ranking information 311 (including the rank of the correlations among predicates and the scores of correlations) 312, selecting the predicates in the front and/or the predicates with relevance scores exceeding a preset threshold, and performing searching with the selected predicates 313 and the entity 303 of "Messi" in the knowledge database 305 together to obtain related triples as searching results 314.

Step g1: providing the obtained searching results 314 to the user.

Description has been made on the processing of knowledge searching based on a knowledge database constructed in the form of triple. In addition, in the embodiments of the present disclosure, improvements are proposed in terms of how to create knowledge in the form of triple.

Processing of Constructing Knowledge in the Form Triple

In general, a triple is extracted from existing corpus which may come from articles on the internet or some corpus provided by users. For example, such corpus may be information from tweets on the internet, articles from blogs or forums, articles provided by users to a server 102 on their own initiative, or contextual contents when users chat with chatbot, or the like. The processing of extracting on triples is mainly to recognize elements of entities (subjects), predicates (predicates) and attributes (objects) in corpus, so as to construct a triple. A corpus in an obvious grammatical structure may be directly subjected to the processing of extracting so as to obtain information of the triple. However, in many corpora, the knowledge included therein may omit or imply the predicate, instead of being presented in an obvious grammatical structure of "subject-predicate-object". For example, in a sentence of "The Imperial Palace in Beijing has the first snow this winter", the term of "Imperial Palace" is a subject and an entity, the term of "has" is a predicate, and the term of "the first snow" is an object and an attribute. Therefore, such sentence may have an obvious triple relationship. However, this sentence may imply knowledge such as "The Imperial Palace is located in (or is in) Beijing", which is actually a triple, and the predicate "is located in" or "is in" is implied in such knowledge. Based on a triple extracting method in the art, such knowledge may be ignored.

Considering the above situation, the embodiments of the present disclosure provide a processing mechanism for extracting the knowledge from implicit triples, in which pair of words which may be possibly used as entities and attributes in a triple may be recognized first in the corpus, and possible predicates may be determined according to a preset semantic rule of predicates, so that a triple may be formed.

With the above processing method for extracting the implicit triples, implicit triple information contained in the corpus may be recognized, so that valuable knowledge points may be extracted from the corpus more deeply.

Figure 4:
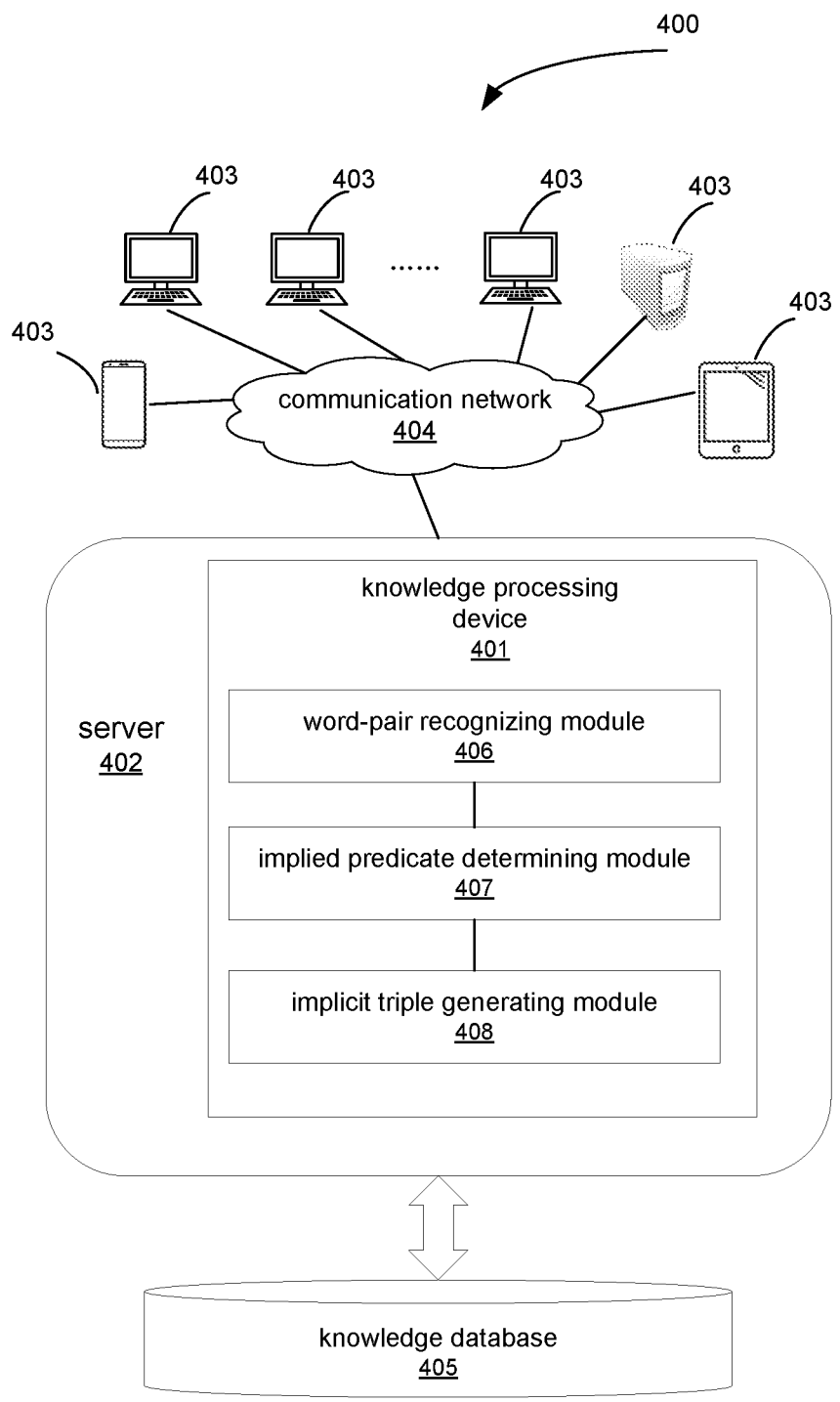
FIG. 4 is a schematic block diagram showing a knowledge processing device according to embodiments of the present disclosure.

More particularly, as shown in FIG. 4, which is a schematic block diagram 400 showing a knowledge processing device according to embodiments of the present disclosure. The knowledge processing device 401 shown in FIG. 4 may be configured to extract implicit triples. The knowledge processing device 401 may be implemented as a small-sized portable (or mobile) electronic apparatus or provided in a small-sized portable (or mobile) electronic apparatus. The small-sized portable (or mobile) electronic apparatus mentioned herein may be, for example, a cellular phone, a personal data assistant (PDA), a personal media player device, a wireless network viewing device, a personal headset device, a special device or a hybrid device including any of the above functions. The knowledge processing device 401 may also be implemented as or provided in a computing device, such as a desktop computer, a notebook computer, a tablet computer, and a specialized server. In addition, the knowledge processing device 401 may also be implemented as a server in a communication network or provided in the server, which may be implemented by one or more computing systems (distributed servers); and the knowledge processing device 401 may also be implemented as a cloud server based on a cloud architecture or provided in the cloud server based on a cloud architecture. Such cloud server may be connected with a user terminal via the communication network to provide a user with a construction service of a cloud-based knowledge database, and may provide a knowledge searching service based on knowledge database at the same time.

As an example, the knowledge processing device 401 shown in FIG. 4 may be provided in a server 402, which is connected with a user terminal 403 and a content server 402 for providing content services (e.g., web sites, blogs, forums, etc.) via a communication network 404. The server 402 may acquire corpus (e.g., articles uploaded by a user initiatively, chat logs between a chatbot and the user, etc.)

for constructing knowledge from the user terminal 402, and may also acquire corpus (e.g., information from microblogs, articles from websites, blogs and forums, and other public knowledge (e.g. Wikipedia), etc.) from the content server 406. The server 402 sends the acquired corpus to the knowledge processing device 401 so as to generate triple information and store the triple information in the knowledge database 405. The knowledge database 405 involved in the embodiments of the present disclosure may be stored in a local storage medium of the server 402 or in another server or database connected with the server 402. More particularly, the server or database storing the knowledge database may be a distributed server or database, or a server or database based on a cloud architecture. The server 402 described above may be a server for supporting an intelligent chatting function of a chatbot. The knowledge processing device 401 may be embedded in a processing module of the chatbot or be used as a program module in communication connection with the chatbot. The server 402 described above may be a searching server for providing a searching service, and may be used for providing knowledge to the user terminal 403.

More particularly, the knowledge processing device 401 described above may include a word-pair recognizing module 406, an implied predicate determining module 407, and an implicit triple generating module 408.

The word-pair recognizing module 406 may be configured to recognize one or more pairs of words correlated with each other from input corpus, and at least one word in such pair of words may be used as an entity in a triple.

The implied predicate determining module 407 may be configured to recognize a relationship between words in a pair of words and determine an implied predicate in the pair of words according to a preset semantic rule of predicates. The semantic rule of predicates mentioned herein may be a rule obtained by performing statistics and abstracting on a large number of predicates on the basis of semantics. For example, in a common grammatical relationship, if two words in a pair of words are in an appositive relationship, these two words may be regarded as in a predicate relationship of "be". As another example, if one of the two words in a pair of words is a word representing a geographic location, and the other one is a word representing a building, and a conjunction between two words in the pair of words is a word modifying relationship such as "of", there may be a predicate such as "be located" or "be in" expressing a geographic location relationship between the two words may be implied between the two words. There are no limitations on the semantic rule of predicates in the embodiments of the present disclosure, and the semantic rule of predicates may be flexibly set according to actual needs (e.g., variety of corpora) or experience.

The implicit triple generating module 408 may be configured to generate an implicit triple based on the implied predicates and pairs of words.

It should be noted that the modules included in the above knowledge processing device 401 are mainly configured to extract implicit triples from corpus. However, the above knowledge processing device 401 may still include a processing module for extracting explicit triples from the corpus, so as to form a complete processing device for extracting triples. A processing mechanism for extracting explicit triples may use processing means in the art, and description thereof may be omitted herein to avoid redundancy.

Figure 5:
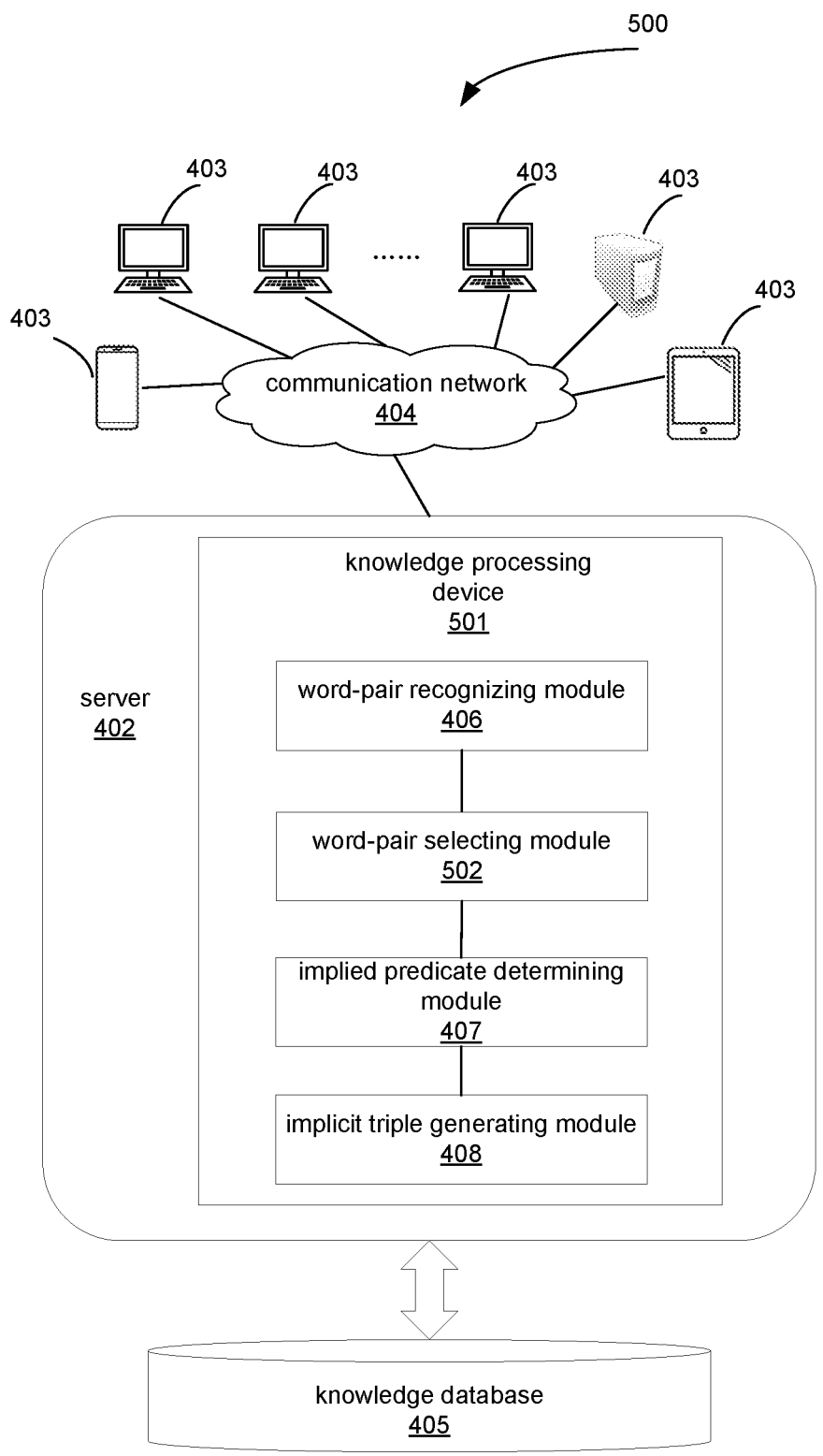
FIG. 5 is a schematic block diagram showing a knowledge processing device according to embodiments of the present disclosure.

Furthermore, as shown in FIG. 5, which is a schematic block diagram 500 showing a knowledge processing device according to embodiments of the present disclosure. As an alternative example, the knowledge processing device 501 shown in FIG. 5 is same as the knowledge processing device 401 in FIG. 4, except that the knowledge processing device 501 may further include a word-pair selecting module 502.

The word-pair selecting module 502 may be configured to performing selection on one or more pairs of words according to an appearing rate of the pairs of words, so as to provide the selected one or more pairs of words to the implied predicate determining module 407. With such processing of the word-pair selecting module 502, the pairs of words with a low appearing rate may be excluded before forming triples, so as to avoid errors or triples with lower values.

The knowledge processing device 101 and the knowledge processing device 401 (or the knowledge processing device 501) mentioned above may be provided in one server or integrated into one processing device so as to construct the knowledge in the knowledge database while providing users with searching services on knowledge. That is to say, functional modules included in the knowledge processing device 101 and the knowledge processing device 401 (or the knowledge processing device 501) mentioned above may be included in one processing device. More particularly, the functional modules included in the knowledge processing device 101 and the knowledge processing device 401 (or the knowledge processing device 501) mentioned above may perform corresponding functions in parallel.

Figure 6:
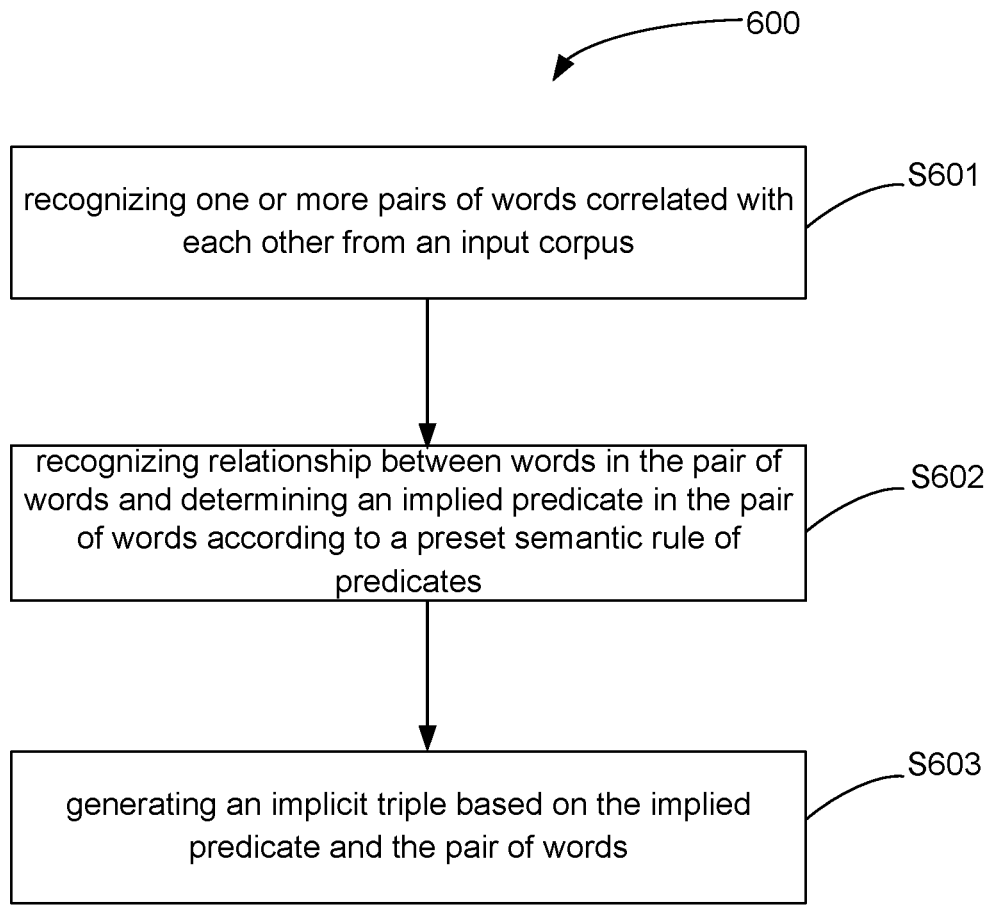
FIG. 6 is a schematic flowchart showing a knowledge processing method according to embodiments of the present disclosure.

The processing of constructing knowledge in the form of triple performed by the knowledge processing device 401 shown in FIG. 4 may be as shown in FIG. 6, which is a schematic flowchart 600 showing a knowledge processing method according to embodiments of the present disclosure. The knowledge processing method may include the following steps.

S601: recognizing one or more pairs of words correlated with each other from an input corpus, and there may be at least one word in the pair of words, which may be used as an entity in a triple. This step may be performed by the word-pair recognizing module 406 described above.

S602: recognizing relationship between words in the pair of words and determining an implied predicate in the pair of words according to a preset semantic rule of predicates. This step may be performed by the implied predicate determining module 407 described above.

S603: generating an implicit triple based on the implied predicate and the pair of words. This step may be performed by the implicit triple generating module 408 described above.

The processing of steps S601 to S603 described above may follow the processing shown in FIG. 2, and may be performed before the processing shown in FIG. 2 or in parallel with the processing shown in FIG. 2.

Figure 7:
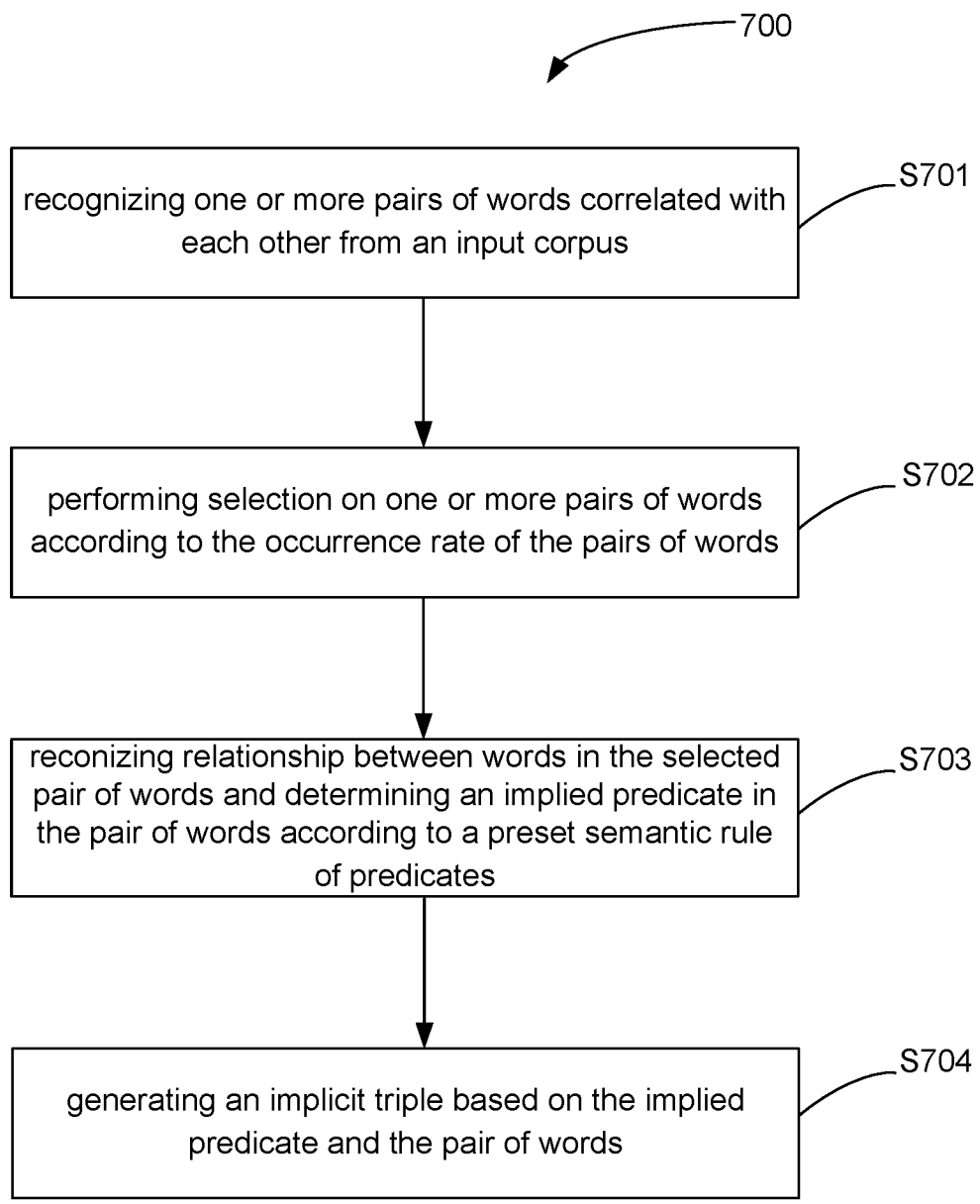
FIG. 7 is a schematic flowchart showing a knowledge processing method according to embodiments of the present disclosure.

The processing of constructing knowledge in the form of triple performed by the knowledge processing device 501 shown in FIG. 5 may be as shown in FIG. 7, which is a schematic flowchart showing a knowledge processing method according to embodiments of the present disclosure. The processing may include the following steps.

S701: recognizing one or more pairs of words correlated with each other from an input corpus, and there may be at least one words in the pair of words, which may be used as an entity in a triple. This step may be performed by the word-pair recognizing module 406 described above.

S702: performing selection on one or more pairs of words according to the occurrence rate of the pairs of words. This step may be performed by the word-pair selecting module 502 described above.

S703: recognizing relationship between words in the selected pair of words and determining an implied predicate in the pair of words according to a preset semantic rule of predicates. This step may be performed by the implied predicate determining module 407 described above.

S704: generating an implicit triple based on the implied predicate and the pair of words. This step may be performed by the implicit triple generating module 408 described above.

The processing of steps S701 to S704 described above may be added in the processing in the flowchart shown in FIG. 2, or may be performed with the processing in the flowchart shown in FIG. 2 in any sequence, or may be performed with the processing in the flowchart shown in FIG. 2 in parallel.

Description has been made on a processing for constructing knowledge in the form of triple according to the embodiments of the present disclosure. The technical details and corresponding technical effect of the processing are described in detail in the above description on the knowledge processing devices and thus the description may be omitted to avoid redundancy.

In the following, description would be made on an example to further explain the processing for constructing knowledge with the implicit triples.

Example 1 for Constructing Knowledge with the Implicit Triples

An article includes a sentence of "A match of the team of Beijing Guo'An was held at 7 o'clock last night in the workers' stadium, and the chief coach of the team of Guo'An, Manzano, was present at the field to coach the team".

With the processing of semantic analysis, it is found that in the term of "the chief coach of the team of Guo'An, Manzano", the terms of "the chief coach of the team of Guo'An" and "Manzano" have coordinate relationship therebetween. With statistics, it is found that such combination (found to be two words by segmenting) of "the chief coach of the team of Guo'An, Manzano" appears a lot. Based on a semantic rule of the predicate regarding "is", it is determined that the predicates such as "is" may be implied in the pair of words, so that a triple such as <the chief coach of Guo'An, is, Manzano> may obtained.

Example 2 for Constructing Knowledge with the Implicit Triples

An article includes a sentence of "The Imperial Palace in Beijing has the first snow this winter".

With the processing of semantic analysis, the terms of "Beijing" and "Imperial Palace" are found, and a conjunction between the two terms is "of" and thus these two terms are in a relationship of modifying. More particularly, the term of "Beijing" refers to information on geographic location, and the term of "Imperial Palace" refers to an entity. There are a lot of combinations of the terms of "Beijing" and "Imperial Palace" in the article. According to a semantic rule of the predicate regarding "be located", it is determined that the predicates such as "is located" may be implied in the pair of words, so that a triple such as <the Imperial Palace, is located in, Beijing> may obtained.

Noise Removing Processing on the Knowledge in the Form of Triple

Description has been made on the processing mechanism of extracting implicit and explicit triples by a user in the above. No matter triples are extracted in any ways, there may be some wrong knowledge or knowledge of low-quality. Such problems may be caused due to the quality of corpus and the flexibility of language expression, and may be also difficult to avoid.

Considering the above problems, the embodiments of the present disclosure provide a processing mechanism for removing noise from the knowledge in the form of triple. More particularly, an entity and a predicate extracted from a triple may be converted into word vectors, and then a vector distance between the entity and the predicate may be determined by calculation, and the vector distance refers to correlation between the words, and a triple may be selected as reservation according to the vector distances.

With the noise removal processing described above, wrong knowledge in the form of triple or knowledge of low-quality in the form of triple in the knowledge database may be eliminated, and thus the knowledge which is subsequent found may be more accurate and effective.

Figure 8:
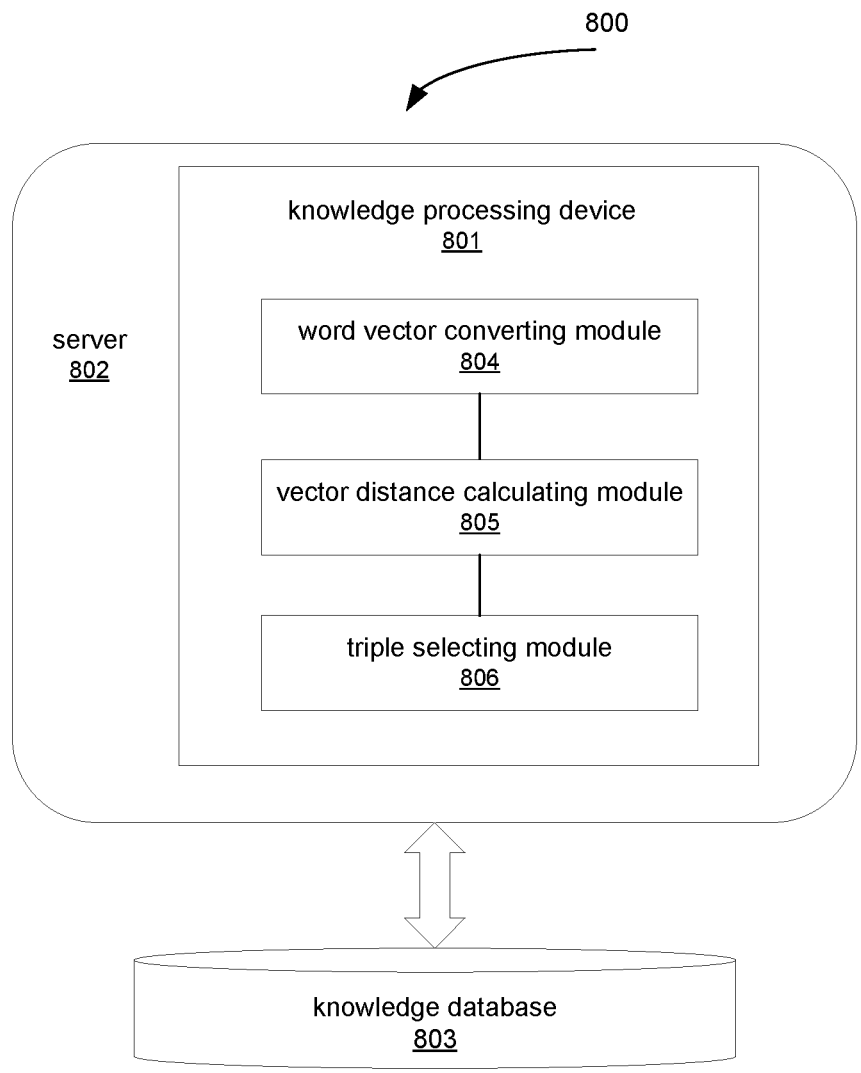
FIG. 8 is a schematic block diagram showing a knowledge processing device according to embodiments of the present disclosure.

As shown in FIG. 8, which is a schematic block diagram 800 showing a knowledge processing device according to embodiments of the present disclosure, the knowledge processing device 801 may be configured to perform noise removing processing on triples. The knowledge processing device 801 may be provided in the same server as the knowledge processing devices in FIGS. 1 to 3 described above, or may be integrated into one knowledge processing device with any of the knowledge processing devices in FIG. 1, FIG. 4 and FIG. 5, so as to perform noise removing processing on the triples in the knowledge database while providing users with services of searching for knowledge and/or constructing knowledge in the knowledge database. It may be obvious that the knowledge processing device 801 may also be provided in a server 802 (as shown in FIG. 8) by itself under an environment same as that of the servers in FIG. 1, FIG. 4 and FIG. 5, so as to perform noise removing processing on the generated triples in the knowledge database 803.

More particularly, the knowledge processing device 801 may include a word vector converting module 804, a vector distance calculating module 805, and a triple selecting module 806.

The word vector converting module 804 may be configured to extract an entity and a predicate from a plurality of triples in the knowledge database, and convert the entity and the predicate into word vectors. More particularly, the entity and the predicate in the plurality of triples may be subjected to a processing of word embedding based on neural network based on a given corpus to generate word vectors.

The vector distance calculating module 805 may be configured to calculate vector distances between the word vectors corresponding to the entity and the predicate in each triple.

The triple selecting module 806 may be configured to performing selection on the plurality of triples according to the vector distances.

Figure 9:
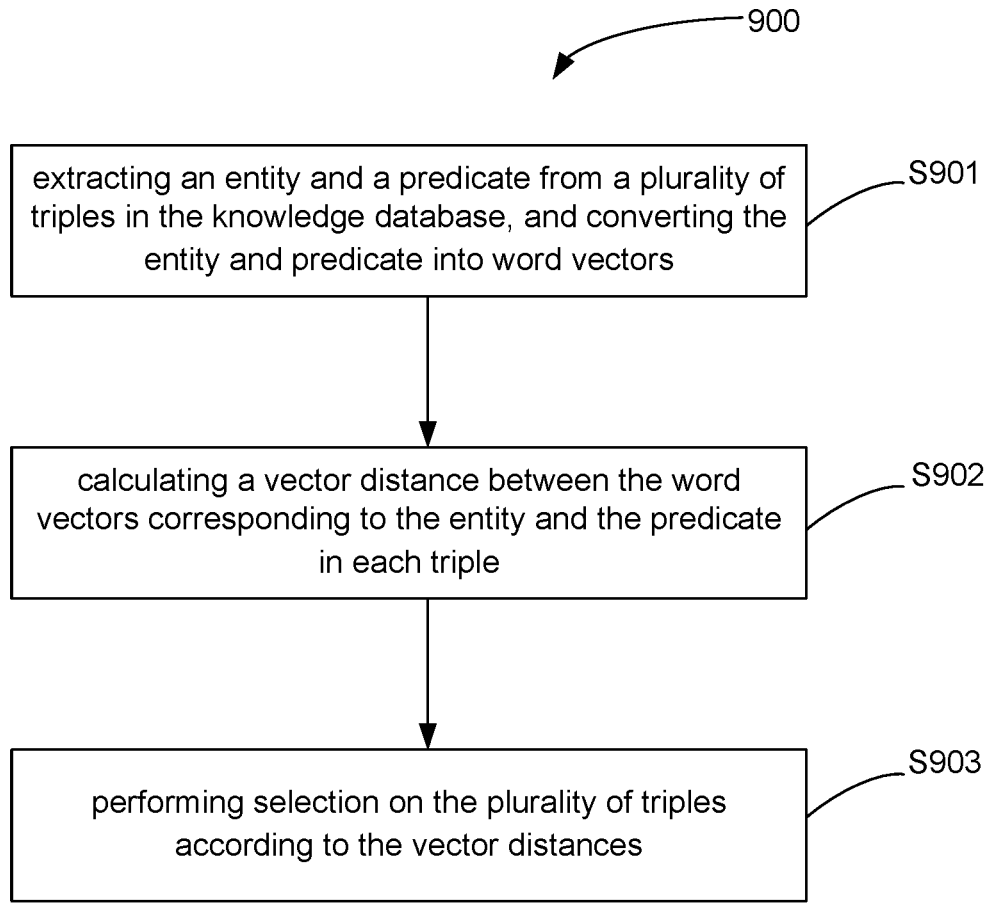
FIG. 9 is a schematic flowchart showing a knowledge processing method according to embodiments of the present disclosure.

The selecting processing on the knowledge in the form of triple performed by the knowledge processing device 801 shown in FIG. 8 may be as shown in FIG. 9, which is a schematic flowchart 900 showing a knowledge processing method according to embodiments of the present disclosure. The processing may include the following steps.

S901: extracting an entity and a predicate from a plurality of triples in the knowledge database, and converting the entity and predicate into word vectors. More particularly, the entity and the predicate in the plurality of triples may be subjected to a processing of word embedding based on neural network based on a given corpus to generate word vectors. This step may be performed by the word vector converting module 804 described above.

S902: calculating a vector distance between the word vectors corresponding to the entity and the predicate in each triple. This step may be performed by the vector distance calculating module 805 described above.

S903: performing selection on the plurality of triples according to the vector distances. This step may be performed by the triple selecting module 806 described above.

The processing of steps S901 to S904 described above may be attached to the processing of FIG. 2, FIG. 6 or FIG. 7, and may be performed with the processing shown in FIG. 2, FIG. 6 or FIG. 7 in any sequence, or in parallel.

The above describes a processing of performing selection on the knowledge in the form of triple according to the embodiments of the present disclosure, and the technical details and a corresponding technical effect of the screening processing flow are described in detail in the previous introduction of the processing device, and will not be repeated here.

Description would be made on the processing of performing selection on knowledge in the form of triple with a simple example of application.

An example of the processing of performing selection on the knowledge in the form of triples

TABLE 2 the following triples may be extracted from an article with respect to an entity (player: XX):

| Original | Triples (entities, predicates and attributes) |
| --- | --- |
| XX got two goals in the first half | XX got two goals |
| XX scored | XX scored (the attribute is null) |
| XX broke through the defender and scored | XX broke through defender XX scored |
| XX club to which XX player belongs was established in 1980 | XX (player) was established in 1980 XX club was established in 1980 |
| XX successfully stole the ball under control of the forward | XX stole the ball under control of the forward |

Step a2: extracting triples from several sentences in table 2 and storing the extracted triples in the knowledge database. More particularly, a plurality of triples may be extracted from one paragraph of the original.

Step b2: performing word embedding based on neural network on entities and predicates based on a given corpus (which at least contains the current article) to generate word vectors.

Step c2: calculating word vector distance (representing the correlation between the entities and each predicate) between the word vectors corresponding to the entities and the word vectors corresponding to the predicates.

Step d2: ranking the word vector distances between the word vectors, and selecting combinations of entities and predicates with a high correlation therebetween as reserved triples according to a preset rule. For example, after ranking, it may be found that the combination of "XX got" and "XX scored" ranks at the top and have high scores (the vector distance is small, and the correlation is high), "XX broke through" has a score in a middle level, and "XX established in" has the lowest score. With such result, the triples related to "XX got" and "XX scored" may be reserved in the knowledge database, and other triples may be removed as noise. If the set selecting strategy is relatively loose (the threshold of the correlation is set to be low), the triple related to "XX player broke through" may also be reserved. The specific strategy may be adjusted according to actual needs.

Description has been made on the searching processing on the knowledge, the constructing processing on the knowledge and related processing on noise with respect to the triples. In the knowledge database, besides the knowledge in the form of triple, there is also knowledge in the form of paragraph. The knowledge in the form of paragraph may include the knowledge consisted of multiple sentences, and may also include the knowledge consisted of a single sentence. In other words, in the embodiments of the present disclosure, sentence may be a special form of paragraph.

Processing on the Knowledge in the Form of Paragraph

In the art, the processing of performing searching on the knowledge in the form of paragraph may mainly include performing direct matching and searching in the knowledge database based on keywords in the user's query, and providing the found matched knowledge to a user. The searching result obtained by the direct matching and retrieving may be constrained by the keywords in the user's query and thus the answers found by such direct matching and retrieving processing may be likely to be incomplete, and even the queried knowledge may be incomplete or incorrect due to the variability and richness of language expression forms.

Considering the above problems, the embodiments of the present disclosure provide a processing of performing searching on the knowledge in the form paragraph. More particularly, such processing may include: retrieving paragraphs containing segmented words (which may be used as searching words for retrieving paragraphs) in the knowledge database so as to form a plurality of combinations of <user' query, paragraph> (referred to as query-pairs) after performing segmentation on the user's query; extracting features from each query-pair to generate a query-pair vector corresponding to the query-pair; inputting the query-pair vector into a correlation ranking model for correlation ranking processing; outputting a rank of the correlations (or the rank of the correlations together with the correlations) between the user's query and paragraphs; and selecting paragraphs based on the rank of the correlations as searching result to be output. It should be noted that in the embodiments of the present disclosure, sentence may be a special form of paragraph and may belong to paragraph in meaning.

More particularly, before query-pair vectors are generated, a processing of selection may be performed on all the combinations of <user's query, paragraph> (i.e., all query-pairs) found based on user's query. In a process of paragraph searching based on segmented words as searching words for the searching processing on paragraphs, since the number of paragraphs containing a specific searching word or similar keywords may be particularly large, in order to avoid the huge cost in subsequent calculation, some features (e.g., BM25 or other features) for matching may be used in the searching process to perform comprehensively scoring and ranking on all the query-pairs found with respect to some user' query, which may then be subjected to selection based on a ranking result. This stage may be referred as stage L1.

Then, the query-pairs reserved in the stage L1 may be subjected to a processing of feature-extracting, to generate query-pair vectors corresponding to the query-pairs. The query pair vector may be then input into a correlation ranking model for correlation ranking processing so as to output a rank of the correlations (or together with the correlations) between the user's query and paragraphs. The paragraphs, which may be output as searching results may be selected based on the rank of the correlations. It should be noted that in the embodiments of the present disclosure, sentence may be a special form of paragraph and may belong to paragraph in meaning.

More particularly, the features extracted from each query-pair and the features in the generated query-pair vector may include:

1) features for matching, for example, BM25 (Best Match 25), LDA (Latent Dirichlet Allocation) and the like;

2) features about semantic correlation obtained by inputting the word vectors converted from the user's query and the paragraphs according to features of semantic relevance between user's query and paragraphs into a deep neural network model. The deep neural network model may be a model trained by a large number of question-answer corpora. These corpora are not limited to the knowledge database itself, but also may be resources on the network. For example, knowledge encyclopedia or FAQ (frequently asked questions) knowledge databases commonly used in the network, etc. More particularly, the processing of converting the user' query and the paragraphs into word vectors may also be performed by the neural network model.

During the above processing, all paragraphs satisfying requirements of the stage L1 are first obtained, and feature vectors are generated by extracting features from the combination of <user' query, paragraphs>, and then with a ranking model, the correlation between the paragraphs and the user's query may be subjected to a processing of ranking, so as to determine the paragraphs to be output. In this way, related paragraphs may be analyzed more deeply and comprehensively, so that it may be possible to find searching result which is more complied with the intention of a user's query.

Figure 10:
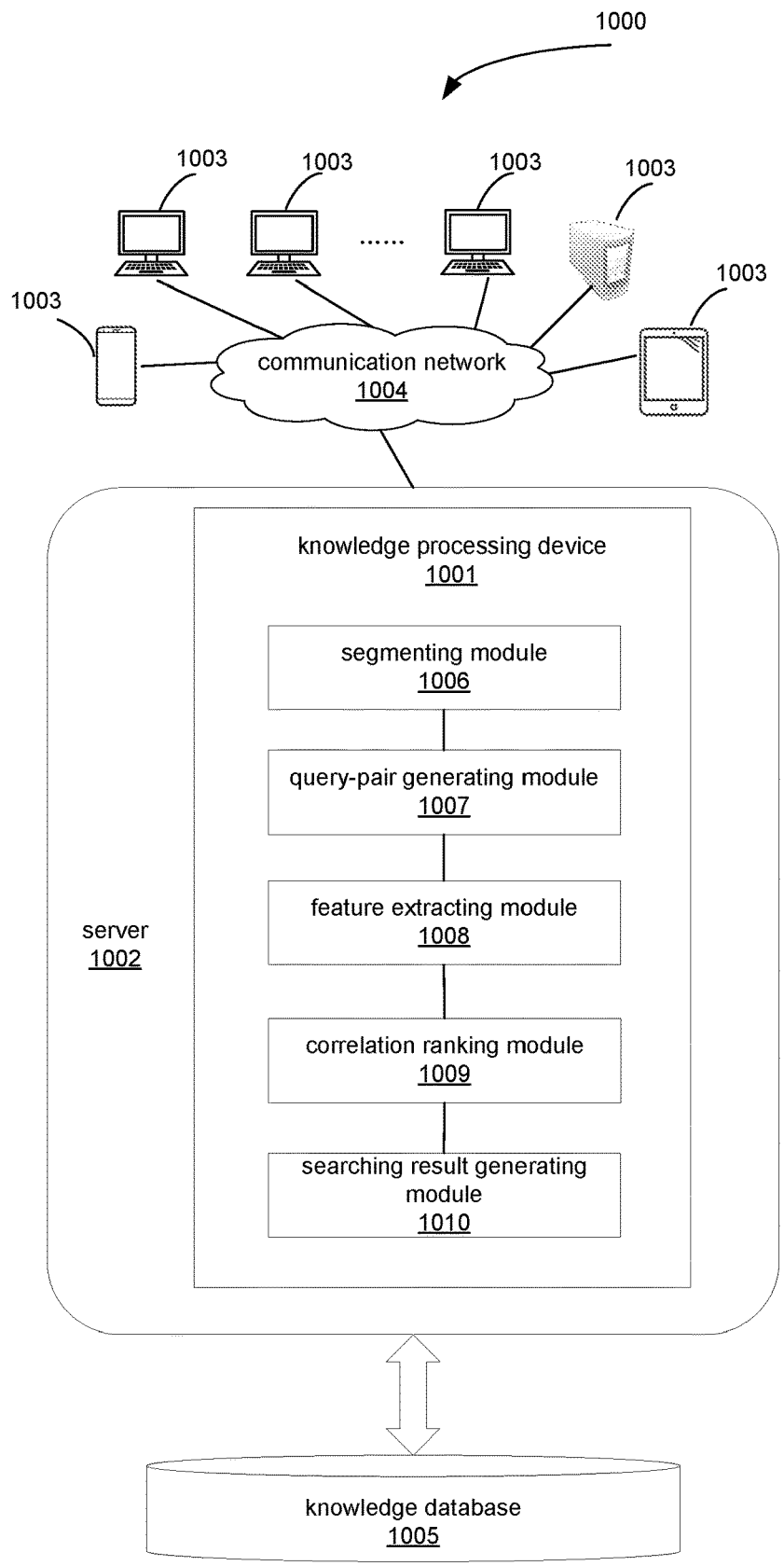
FIG. 10 is a schematic block diagram showing a knowledge processing device according to embodiments of the present disclosure.

As shown in FIG. 10, which is a schematic block diagram 1000 showing a knowledge processing device according to embodiments of the present disclosure, the knowledge processing device 1001 may be implemented as a small-sized portable (or mobile) electronic apparatus or provided in a small-sized portable (or mobile) electronic apparatus. The small-sized portable (or mobile) electronic apparatus mentioned herein may be, for example, a cellular phone, a personal data assistant (PDA), a personal media player device, a wireless network viewing device, a personal headset device, a special device or a hybrid device including any of the above functions. The knowledge processing device 1001 may also be implemented as or provided in a computing device, such as a desktop computer, a notebook computer, a tablet computer, and a specialized server. In addition, the knowledge processing device 1001 may also be implemented as a server in a communication network or provided in the server, which may be implemented by one or more computing systems (distributed servers); and the knowledge processing device 1001 may also be implemented as a cloud server based on a cloud architecture or provided in the cloud server based on a cloud architecture. Such cloud server may be connected with a user terminal via the communication network to provide a user with a construction service of a cloud-based knowledge database, and may provide a knowledge searching service based on knowledge database at the same time.

Description would be made on the searching processing method and device with respect to the knowledge in the form of paragraph.

As an example, a knowledge processing device 1001 may be provided in an environment similar to that of FIG. 1. That is to say, the knowledge processing device 1001 shown in FIG. 10 is provided in a server 1002. The server 1002 is connected with a user terminal 1003 via a communication network 1004. The user terminal 1003 sends a user's query to the server 1002 via the communication network 1004. After receiving the user's query sent by the user terminal, the server 1002 sends the user's query to the knowledge processing device 1001 so as to generate a searching result, which may be returned to the user terminal 1004 via the communication network 1004. The knowledge database 1005 involved in the embodiments of the present disclosure may be stored in a local storage medium of the server 1002 or in another server or database connected with the server 1002. The server or database storing the knowledge database may be a distributed server or database, or a server or database based on a cloud architecture. The server 1002 may be a server for supporting an intelligent chatting function of a chatbot, and the knowledge processing device 1001 may be embedded in a processing module of the chatbot or be used as a program module in communication connection with the chatbot. The server 1002 may be a searching server for providing searching services, and the searching server may be used for providing knowledge to users.

Furthermore, the knowledge processing device 1001 may also be provided in the same server with the processing devices in FIGS. 1 to 4 described above, or may be integrated into an identical processing device with any one of the processing devices shown in FIGS. 1 to 3 to provide searching processing based on the knowledge in the form of paragraph while providing users with a service of performing searching on knowledge and/or constructing the knowledge in the knowledge database and/or removing noise from triples.

More particularly, the knowledge processing device 1001 includes a segmenting module 1006, a query-pair generating module 1007, a feature extracting module 1008, a correlation ranking module 1009, and a searching result generating module 1010.

The segmenting module 1006 may be configured to perform segmenting on a user's query and generate a plurality of searching words.

The query-pair generating module 1007 may be configured to acquire a plurality of paragraphs containing the searching words in the knowledge database according to the searching words respectively, and generate a plurality of query-pairs consisted of user's queries and respective paragraphs.

In order to improve the efficiency of the processing, in a process of generating the query-pairs, a processing of comprehensive scoring and ranking may be performed on all the found query-pairs with respect to the user's queries by using features in matching aspects (for example BM25 and the like), and performing selection according to the ranking result, so as to provide the selected query-pairs to the feature extracting module 1008 for subsequent processing.

The feature extracting module 1008 may be configured to extract features from each pair of queries and generate a plurality of query-pair vectors. The processing of extracting features from the query-pairs may include: extracting one or more features of BM25 features, LDA features, and features of semantic correlation between user's query and paragraphs from the query-pairs. Furthermore, the processing of extracting the features of semantic correlation between user's query and paragraphs may include: converting the user's query and the paragraphs into word vectors; and inputting the word vectors into a deep neural network model, so as to generate the features of semantic correlation between the user's query and the paragraphs.

The correlation ranking module 1009 may be configured to input a plurality of query-pair vectors into a correlation ranking model to be ranked, and generate a rank of the correlation between the user's query and the paragraphs and/or a correlation between the user's query and the paragraphs.

The searching result generating module 1010 may be configured to determine one or more paragraphs as searching results according to a preset correlation threshold and/or a correlation-rank selecting strategy.

Figure 11:
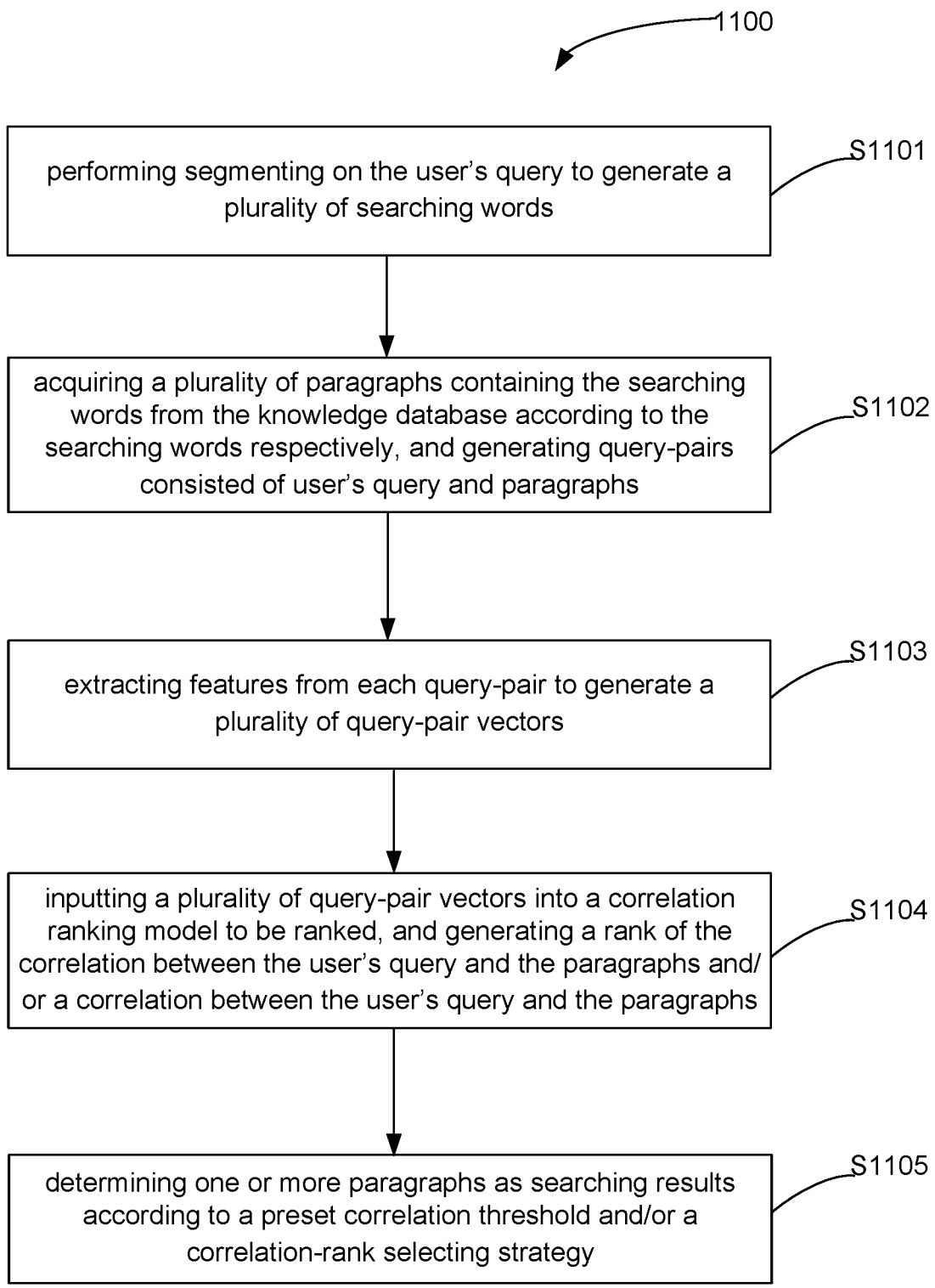
FIG. 11 is a schematic flowchart showing a knowledge processing method according to embodiments of the present disclosure.

The processing of performing searching on the knowledge in the form of paragraph performed by the knowledge processing device 1001 in FIG. 10 may be as shown in FIG. 11, which is a schematic flowchart 1100 showing a knowledge processing method according to embodiments of the present disclosure. The processing may include the following steps.

S1101: performing segmenting on the user's query to generate a plurality of searching words. This step may be performed by the segmenting module 1006 described above.

S1102: acquiring a plurality of paragraphs containing the searching words from the knowledge database according to the searching words respectively, and generating query-pairs consisted of user's query and paragraphs. This step may be performed by the query-pair generating module 1007 described above.

In order to improve the efficiency of the processing, in a process of generating the query-pairs, a processing of comprehensive scoring and ranking may be performed on all the found query-pairs with respect to the user's queries by using features in matching aspects (for example BM25 and the like), and performing selection according to the ranking result, so as to performing subsequent processing based on the selected query-pairs.

S1103: extracting features from each query-pair to generate a plurality of query-pair vectors. The processing of extracting features from the query-pairs may include: extracting one or more features of BM25 features, LDA features, and features of semantic correlation between user's query and paragraphs from the query-pairs. Furthermore, the processing of extracting the features of semantic correlation between user's query and paragraphs may include: converting the user's query and the paragraphs into word vectors; and inputting the word vectors into a deep neural network model, so as to generate the features of semantic correlation between the user's query and the paragraphs. This step may be performed by the feature extracting module 1008 described above.

S1104: inputting a plurality of query-pair vectors into a correlation ranking model to be ranked, and generating a rank of the correlation between the user's query and the paragraphs and/or a correlation between the user's query and the paragraphs. This step may be performed by the correlation ranking module 1009 described above.

S1105: determining one or more paragraphs as searching results according to a preset correlation threshold and/or a correlation-rank selecting strategy. This step may be performed by the searching result generating module 1010 described above.

The processing of steps S1101 to S1105 described above may be attached to the processing shown in FIG. 2, FIG. 6, FIG. 7 or FIG. 9, and may be performed in any sequence with the flow shown in FIG. 2, FIG. 6, FIG. 7 or FIG. 9, or may be performed in parallel.

The above describes a processing of performing searching on the knowledge in the form of paragraph according to the embodiments of the present disclosure, and the technical details and a corresponding technical effect of the searching processing are described in detail in the previous introduction of the processing device, and will not be repeated here.

An Example of Performing Searching on the Knowledge in the Form of Paragraph

Figure 12:
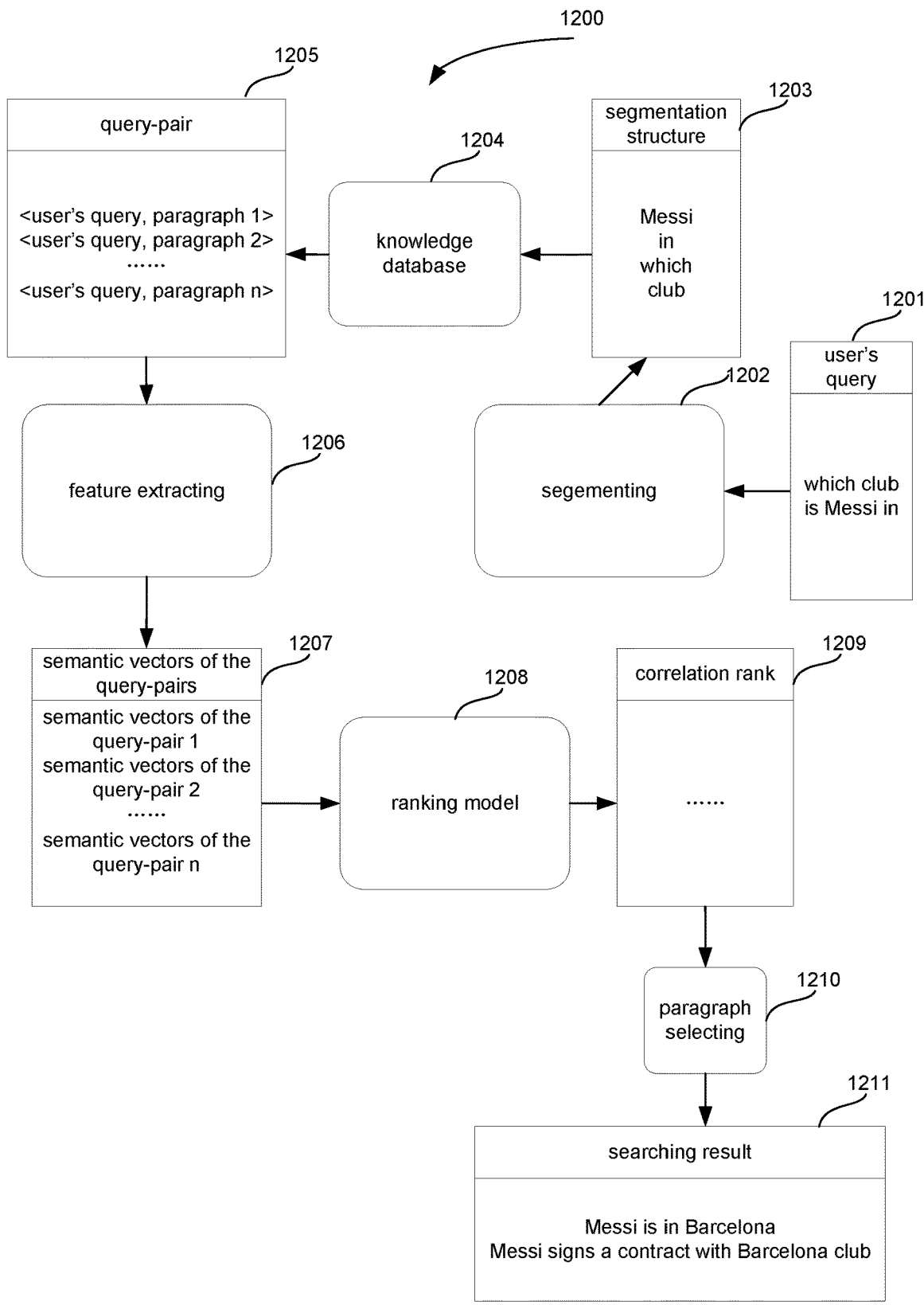
FIG. 12 is a schematic flowchart showing processing of embodiments of the present disclosure.

In this example, a user's query "which club is Messi in" may be used as an illustrative example, and the whole processing process is shown in FIG. 12 which is a schematic flowchart 1200 showing processing of embodiments of the present disclosure.

Step a3: obtaining a user's query 1201 of "which club is Messi in" input by the user;

Step b3: performing segmenting 1202 on the user's query 1201 to obtain a segmentation structure 1203 of "Messi/in/which/club".

Step c3: performing searching with the segmented words as searching words in the knowledge database 1204 to find paragraphs containing one or more segmented words, and constructing a query-pair 1205 of <user's query, paragraphs> with the paragraphs and the user's query.

It should be noted that during searching, in order to narrow down the range of searching, some segmented words or combinations that have no meaning for the purpose of searching may be removed. For example, the interrogative of "where" may be removed, and the processing of searching may be performed only on the words of "Messi", "in" and "club". As another example, the processing of searching may be performed only on paragraphs containing combinations such as "Messi" and "club", "Messi" and "in", as well as "in" and "club". In addition, the processing of searching may be performed on the query-pairs generated in this stage based on features for matching (e.g., BM25), and the selected query-pairs may be further subjected to the processing of feature extracting 1206.

In the present disclosure, paragraphs may be preprocessed, and each paragraph corresponds to a knowledge point. A sentence may be used as a paragraph, that is, a sentence is a special form of a paragraph. For example, the paragraphs found in the knowledge database 1204 are listed in table 3 below, and examples of sentences used as paragraphs are more adopted for simplicity of description.

TABLE 3

| Query-pair of <user's query, paragraphs> |
| --- |
| Which club is Messi in, Messi belongs to Barcelona club |
| Which club is Messi in, Messi scored 500+ |
| Which club is Messi in, Messi scored and won the game |
| Which club is Messi in, Messi is Argentine |
| Which club is Messi in, Messi is a forward |
| Which club is Messi in, Messi is a player of Barcelona club |
| Which club is Messi in, Messi is the Best FIFA Men's Player |
| Which club is Messi in, Messi is in Barcelona |
| Which club is Messi in, Messi is in Barcelona |
| Which club is Messi in, Messi is in Spain |
| Which club is Messi in, Messi is in Spain |
| Which club is Messi in, Messi signs a contract with Barcelona club |
| Which club is Messi in, Messi signs a contract of 20 million dollars |
| Which club is Messi in, Messi plays for Barcelona club |

Step d3: performing feature extracting 1206 on these query-pairs 1205, and generating semantic vectors 1207 of the query-pairs. The extracted features may include features for matching (BM25 features, LDA features, etc.), and features of semantic correlation between user's query and paragraphs, and these features may be integrated to generate semantic vectors of the query-pairs.

Step e3: the semantic vectors 1207 of the query-pairs are input into a ranking model 1208 for processing to generate a correlation rank 1209 between the user's query and each paragraph.

Step f3: performing paragraph selecting 1210 according to the correlation rank 1209, so as to select the paragraphs with the correlation ranked at the top as searching result 1211 and output the searching result 1211.

Specific Embodiments

In some examples, one or more components or modules and one or more steps as shown in FIG. 1 to FIG. 12 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 13:
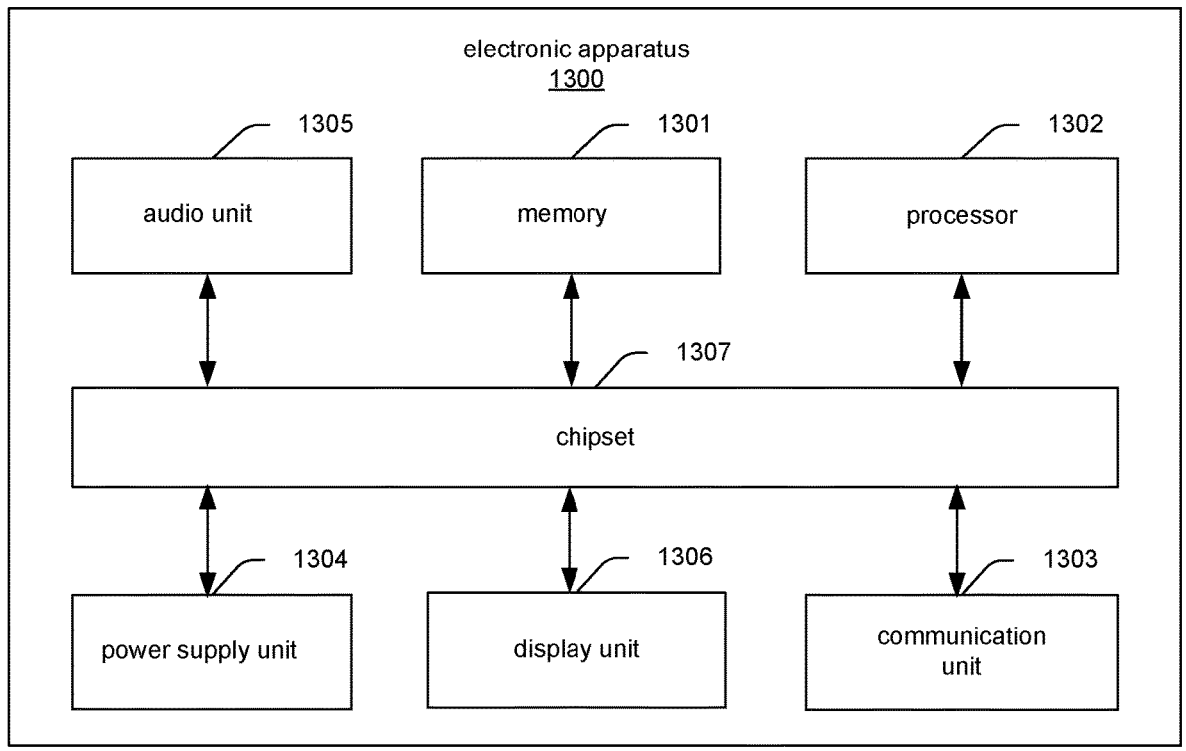
FIG. 13 is a block diagram of an electronic apparatus according to embodiments of the present disclosure.

As shown in FIG. 13, which is a block diagram 1300 of an electronic apparatus according to embodiments of the present disclosure, the electronic apparatus 1300 includes a memory 1301 and a processor 1302.

The memory 1301 may be configured to store programs. In addition to the above programs, the memory 1301 may be configured to store other data to support operations on the electronic apparatus 1300. The examples of these data may include instructions of any applications or methods operated on the electronic apparatus 1300, contact data, phone book data, messages, pictures, videos, and the like.

The memory 1301 may be implemented by any kind of volatile or nonvolatile storage device or their combinations, such as static random access memory (SRAM), electronically erasable programmable read-only memory (EE-PROM), erasable programmable read-only memory (EPROM), programmable read-only memory (PROM), read-only memory (ROM), magnetic memory, flash memory, disk memory, or optical disk.

The memory 1301 may be coupled to the processor 1302 and contain instructions stored thereon. The instructions may cause the electronic apparatus 1300 to perform operations upon being executed by the processor 1302, the operations may include:
- extracting an entity and a first predicate from a user's query;
- searching for a plurality of second predicates matched with the entity in a knowledge database according to the entity in the user's query;
- calculating correlations between the first predicate and the plurality of second predicates, and performing selection on the plurality of second predicates according to the correlations to determine one or more third predicates; and
- performing searching in the knowledge database based on the third predicate and the entity in the user's query to acquire knowledge.

More particularly, the calculating correlations between the first predicate and the plurality of second predicates, and performing selection on the plurality of second predicates according to the correlations to determine one or more third predicates may include:
- converting the first predicate and the plurality of second predicates into semantic vectors, and performing semantic relevance analyzing to generate a rank of correlations between the plurality of second predicates and the first predicate and/or correlations between the plurality of second predicates and the first predicate; and
- determining one or more third predicates according to a preset correlation threshold and/or a correlation rank selecting strategy.

More particularly, the performing semantic relevance analyzing may include performing semantic relevance analyzing based on a neural network model.

More particularly, the knowledge may be stored in the form of triple in the knowledge database, and the method further includes a processing of extracting implicit triples including:
- recognizing one or more pairs of words correlated with each other from an input corpus, wherein at least one word in the pair of words may be used as an entity in the triple;
- recognizing relationship between the words in the pair of words and determining an implied predicate in the pair of words according to a preset semantic rule of predicates; and
- generating the implicit triple based on the implied predicate and the pair of words.

More particularly, the method may further include: after recognizing the pairs of words correlated with each other,
- performing selection on the one or more pairs of words according to occurrence rates of the pairs of words, and determining the implied predicate according to the selected one or more pairs of words.

More particularly, the knowledge is stored in the form of triple in the knowledge database, and the method further includes: performing a processing of removing noise from a plurality of extracted triples, and the processing of removing noise from a plurality of extracted triples may include:
- extracting entities and predicates from a plurality of triples in the knowledge database, and converting the entities and the predicates into word vectors;
- calculating vector distances between the word vectors corresponding to the entities and the predicates in the triples; and
- performing selection on the plurality of triples according to the vector distances.

More particularly, the converting the entities and the predicates into word vectors includes:
- performing word embedding based on neural network on the entities and the predicates in the plurality of triples based on a given corpus to generate word vectors.

As another embodiment of the electronic apparatus, the instructions may cause the electronic apparatus to perform operations upon being executed by the processor 1302, and the operations may include:
- recognizing one or more pairs of words correlated with each other from an input corpus, wherein at least one word in the pair of words may be used as an entity in the triple;
- recognizing relationship between the words in the pair of words and determining an implied predicate in the pair of words according to a preset semantic rule of predicates; and
- generating the implicit triple based on the implied predicate and the pair of words.

As still another embodiment of the electronic apparatus, the instructions may cause the electronic apparatus to perform operations upon being executed by the processor 1302, and the operations may include:

extracting entities and predicates from a plurality of triples in the knowledge database, and converting the entities and the predicates into word vectors;

calculating vector distances between the word vectors corresponding to the entities and the predicates in the triples; and performing selection on the plurality of triples according to the vector distances.

As another embodiment of the electronic apparatus, the instructions may cause the electronic apparatus to perform operations upon being executed by the processor 1302, and the operations may include:

segmenting words of the user's query to generate a plurality of query-words;

acquiring a plurality of paragraphs containing the query-words from the knowledge database according to the query-words respectively, and generating query-pairs consisted of user's query and paragraphs;

extracting features of query-pairs to generate a plurality of query-pair vectors;

inputting the plurality of query-pair vectors into a correlation ranking model, and generating a rank of correlation between the user's query and the paragraphs and/or a correlation between the user's query and the paragraphs; and determining one or more paragraphs as searching results according to a preset correlation threshold and/or a correlation rank selecting strategy.

In order to improve the efficiency of the processing, in a process of generating the query-pairs, a processing of comprehensive scoring and ranking may be performed on all the found query-pairs with respect to the user's queries by using features for matching (for example BM25 and the like), and performing selection according to the ranking result, so as to performing subsequent processing based on the selected query-pairs.

More particularly, the extracting features from query-pairs may include:

extracting one or more features of BM25 features, LDA features, and features of semantic correlation between user's query and paragraphs from the query-pairs.

More particularly, the extracting the features of semantic correlation between user's query and paragraphs may include:

converting the user's query and the paragraphs into word vectors, and inputting the word vectors into a deep neural network model so as to generate the features of semantic correlation between the user's query and the paragraphs.

Detailed description has been made on the above operations in the above embodiments of method and device. The description on the above operations may be applied to electronic apparatus 1300. That is to say, the specific operations mentioned in the above embodiments may be recorded in memory 1301 in program and be performed by processor 1302.

Furthermore, as shown in FIG. 13, the electronic apparatus 1300 may further include: a communication unit 1303, a power supply unit 1304, an audio unit 1305, a display unit 1306, chipset 1307, and other units. Only part of units are exemplarily shown in FIG. 13 and it is obvious to one skilled in the art that the electronic apparatus 1300 only includes the units shown in FIG. 13.

The communication unit 1303 may be configured to facilitate wireless or wired communication between the electronic apparatus 1300 and other apparatuses. The electronic apparatus may be connected to wireless network based on communication standard, such as WiFi, 2G, 3G, or their combination. In an exemplary example, the communication unit 1303 may receive radio signal or radio related information from external radio management system via radio channel. In an exemplary example, the communication unit 1303 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1304 may be configured to supply power to various units of the electronic device. The power supply unit 1304 may include a power supply management system, one or more power supplies, and other units related to power generation, management, and allocation.

The audio unit 1305 may be configured to output and/or input audio signals. For example, the audio unit 1305 may include a microphone (MIC). When the electronic apparatus in an operation mode, such as calling mode, recording mode, and voice recognition mode, the MIC may be configured to receive external audio signals. The received audio signals may be further stored in the memory 1301 or sent via the communication unit 1303. In some examples, the audio unit 1305 may further include a speaker configured to output audio signals.

The display unit 1306 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1301, processor 1302, communication unit 1303, power supply unit 1304, audio unit 1305 and display unit 1306 may be connected with the chipset 1307. The chipset 1307 may provide interface between the processor 1302 and other units of the electronic apparatus 1300. Furthermore, the chipset 1307 may provide interface for each unit of the electronic apparatus 1300 to access the memory 1301 and communication interface for accessing among units.

Example Clauses

A. A method including:

extracting an entity and a first predicate from a user's query;

searching for a plurality of second predicates matched with the entity in a knowledge database according to the entity in the user's query;

calculating correlations between the first predicate and the plurality of second predicates, and performing selection on the plurality of second predicates according to the correlations to determine one or more third predicates; and performing searching in the knowledge database based on the third predicate and the entity in the user's query to acquire knowledge.

B. The method according to paragraph A, wherein the calculating correlations between the first predicate and the plurality of second predicates, and performing selection on the plurality of second predicates according to the correlations to determine one or more third predicates includes:

converting the first predicate and the plurality of second predicates into semantic vectors, and performing semantic relevance analyzing to generate a rank of correlations between the plurality of second predicates and the first predicate and/or correlations between the plurality of second predicates and the first predicate; and determining one or more third predicates according to a preset correlation threshold and/or a correlation rank selecting strategy.

C. The method according to paragraph B, wherein the performing semantic relevance analyzing includes: performing semantic relevance analyzing based on a neural network model.

D. The method according to paragraph A, wherein the knowledge is stored in the form of triple in the knowledge database, and the method further includes extracting implicit triples including:

recognizing one or more pairs of words correlated with each other from an input corpus, wherein at least one word in the pair of words is to be used as an entity in the triple;

recognizing relationship between the words in the pair of words and determining an implied predicate in the pair of words according to a preset semantic rule of predicates; and generating the implicit triple based on the implied predicate and the pair of words.

E. The method according to paragraph D, wherein after recognizing the pairs of words correlated with each other, the method further includes:

performing selection on the one or more pairs of words according to occurrence rates of the pairs of words, and determining the implied predicate according to the selected one or more pairs of words.

F. The method according to paragraph A, wherein the knowledge is stored in the form of triple in the knowledge database, and the method further includes removing noise from a plurality of extracted triples, and the removing noise from a plurality of extracted triples includes:

extracting entities and predicates from a plurality of triples in the knowledge database, and converting the entities and the predicates into word vectors;

calculating vector distances between the word vectors corresponding to the entities and the predicates in the triples; and performing selection on the plurality of triples according to the vector distances.

G. The method according to paragraph F, wherein the converting the entities and the predicates into word vectors includes:

performing word embedding based on neural network on the entities and the predicates in the plurality of triples based on a given corpus to generate word vectors.

H. A device, including:

an extracting module configured to extract an entity and a first predicate from a user's query;

a predicate searching module configured to search for a plurality of second predicates matched with the entity in a knowledge database according to the entity in the user's query;

a predicate selecting module configured to calculate correlations between the first predicate and the plurality of second predicates, and perform selection on the plurality of second predicates according to the correlations to determine one or more third predicates; and a knowledge acquiring module configured to perform searching in the knowledge database based on the third predicate and the entity in the user's query to acquire knowledge.

I. The device according to paragraph H, wherein the predicate selecting module includes:

a semantic relevance analyzing module configured to convert the first predicate and the plurality of second predicates into semantic vectors, and perform semantic relevance analyzing to generate a rank of correlations between the plurality of second predicates and the first predicate and/or correlations between the plurality of second predicates and the first predicate; and a predicate determining module configured to determine one or more third predicates according to a preset correlation threshold and/or a correlation rank selecting strategy.

J. The device according to paragraph I, wherein the performing semantic relevance analyzing comprises: performing semantic relevance analyzing based on a neural network model.

K. The device according to paragraph H, wherein the knowledge is stored in the form of triple in the knowledge database, and the device further includes:

a word-pair recognizing module configured to recognize one or more pairs of words correlated with each other from an input corpus, wherein at least one word in the pair of words is to be used as an entity in the triple;

an implied predicate determining module configured to recognize relationship between the words in the pair of words and determine an implied predicate in the pair of words according to a preset semantic rule of predicates; and an implicit triple generating module configured to generate the implicit triple based on the implied predicate and the pair of words.

L. The device according to paragraph K, further comprising:

a word-pair selecting module configured to perform selection on the one or more pairs of words according to occurrence rates of the pairs of words, and provide the selected one or more pairs of words to the implied predicate determining module.

M. The device according to paragraph H, wherein the knowledge is stored in the form of triple in the knowledge database, and the device further includes:

a word-vector converting module configured to extract entities and predicates from a plurality of triples in the knowledge database, and convert the entities and the predicates into word vectors;

a vector distance calculating module configured to calculate vector distances between the word vectors corresponding to the entities and the predicates in the triples; and a triple selecting module configured to perform selection on the plurality of triples according to the vector distances.

N. The device according to paragraph M, wherein the converting the entities and the predicates into word vectors includes:

performing word embedding based on neural network on the entities and the predicates in the plurality of triples based on a given corpus to generate word vectors.

O. An electronic apparatus, including:

a processing unit; and a memory, coupled to the processing unit and containing instructions stored thereon, the instructions cause the electronic apparatus to perform operations upon being executed by the processing unit, the operations include:
extracting an entity and a first predicate from a user's query;
searching for a plurality of second predicates matched with the entity in a knowledge database according to the entity in the user's query;
calculating correlations between the first predicate and the plurality of second predicates, and performing selection on the plurality of second predicates according to the correlations to determine one or more third predicates; and
performing searching in the knowledge database based on the third predicate and the entity in the user's query to acquire knowledge.

P. The electronic apparatus according to paragraph O, wherein the calculating correlations between the first predicate and the plurality of second predicates, and performing selection on the plurality of second predicates according to the correlations to determine one or more third predicates includes:
converting the first predicate and the plurality of second predicates into semantic vectors, and performing semantic relevance analyzing to generate a rank of correlations between the plurality of second predicates and the first predicate and/or correlations between the plurality of second predicates and the first predicate; and
determining one or more third predicates according to a preset correlation threshold and/or a correlation rank selecting strategy.

Q. The electronic apparatus according to paragraph P, wherein the performing semantic relevance analyzing includes: performing semantic relevance analyzing based on a neural network model.

R. The electronic apparatus according to paragraph O, wherein the knowledge is stored in the form of triple in the knowledge database, and the operations further include extracting implicit triples including:
recognizing one or more pairs of words correlated with each other from an input corpus, wherein at least one word in the pair of words is to be used as an entity in the triple;
recognizing relationship between the words in the pair of words and determining an implied predicate in the pair of words according to a preset semantic rule of predicates; and
generating the implicit triple based on the implied predicate and the pair of words.

S. The electronic apparatus according to paragraph R, after recognizing the pairs of words correlated with each other, the operations further include:
performing selection on the one or more pairs of words according to occurrence rates of the pairs of words, and determining the implied predicate according to the selected one or more pairs of words.

T. The electronic apparatus according to paragraph O, wherein the knowledge is stored in the form of triple in the knowledge database, and the operations further include removing noise from a plurality of extracted triples, and the removing noise from a plurality of extracted triples includes:
extracting entities and predicates from a plurality of triples in the knowledge database, and converting the entities and the predicates into word vectors;
calculating vector distances between the word vectors corresponding to the entities and the predicates in the triples; and
performing selection on the plurality of triples according to the vector distances.

U. The electronic apparatus according to paragraph T, wherein the converting the entities and the predicates into word vectors includes:
performing word embedding based on neural network on the entities and the predicates in the plurality of triples based on a given corpus to generate word vectors.

V. A method, including:
recognizing one or more pairs of words correlated with each other from an input corpus, wherein at least one word in the pair of words may be used as an entity in the triple;
recognizing relationship between the words in the pair of words and determining an implied predicate in the pair of words according to a preset semantic rule of predicates; and
generating the implicit triple based on the implied predicate and the pair of words.

W. A device, including:
a word-pair recognizing module configured to recognize one or more pairs of words correlated with each other from an input corpus, wherein at least one word in the pair of words may be used as an entity in the triple;
an implied predicate determining module configured to recognize relationship between the words in the pair of words and determine an implied predicate in the pair of words according to a preset semantic rule of predicates; and
an implicit triple generating module configured to generate the implicit triple based on the implied predicate and the pair of words.

X. An electronic apparatus, including:
a processing unit; and
a memory, coupled to the processing unit and containing instructions stored thereon, the instructions cause the electronic apparatus to perform operations upon being executed by the processing unit, the operations include:
recognizing one or more pairs of words correlated with each other from an input corpus, wherein at least one word in the pair of words may be used as an entity in the triple;
recognizing relationship between the words in the pair of words and determining an implied predicate in the pair of words according to a preset semantic rule of predicates; and
generating the implicit triple based on the implied predicate and the pair of words.

Y. A method including:
extracting entities and predicates from a plurality of triples in the knowledge database, and converting the entities and the predicates into word vectors;
calculating vector distances between the word vectors corresponding to the entities and the predicates in the triples; and
performing selection on the plurality of triples according to the vector distances.

Z. A device including:
a word-vector converting module configured to extract entities and predicates from a plurality of triples in the knowledge database, and convert the entities and the predicates into word vectors;
a vector distance calculating module configured to calculate vector distances between the word vectors corresponding to the entities and the predicates in the triples; and a triple selecting module configured to perform selection on the plurality of triples according to the vector distances.

A1. An electronic apparatus, including:
a processing unit; and
a memory, coupled to the processing unit and containing instructions stored thereon, the instructions cause the electronic apparatus to perform operations upon being executed by the processing unit, the operations include:
extracting entities and predicates from a plurality of triples in the knowledge database, and converting the entities and the predicates into word vectors;
calculating vector distances between the word vectors corresponding to the entities and the predicates in the triples; and
performing selection on the plurality of triples according to the vector distances.

B1. A method, including:
segmenting words of the user's query to generate a plurality of query-words;
acquiring a plurality of paragraphs containing the query-words from the knowledge database according to the query-words respectively, and generating query-pairs consisted of user's query and paragraphs;
extracting features of query-pairs to generate a plurality of query-pair vectors;
inputting the plurality of query-pair vectors into a correlation ranking model, and generating a rank of correlation between the user's query and the paragraphs and/or a correlation between the user's query and the paragraphs; and
determining one or more paragraphs as searching results according to a preset correlation threshold and/or a correlation rank selecting strategy.

C1. The method according to paragraph B1, wherein the extracting features from query-pairs includes:
extracting one or more features of BM25 features, LDA features, and features of semantic correlation between user's query and paragraphs from the query-pairs.

D1. The method according to paragraph C1, wherein the extracting the features of semantic correlation between user's query and paragraphs includes:
converting the user's query and the paragraphs into word vectors, and inputting the word vectors into a deep neural network model so as to generate the features of semantic correlation between the user's query and the paragraphs.

E1. The method according to paragraph B 1, wherein in a process of generating the query-pairs, performing comprehensive scoring and ranking on all the found query-pairs with respect to the user's queries by using features for matching, and performing selection according to the ranking result, so as to performing subsequent processing based on the selected query-pairs.

F1. A device including:
a segmenting module configured to segment words of the user's query to generate a plurality of query-words;
a query-pair generating module configured to acquire a plurality of paragraphs containing the query-words from the knowledge database according to the query-words respectively, and generate query-pairs consisted of user's query and paragraphs;
a feature extracting module configured to extract features of query-pairs to generate a plurality of query-pair vectors;
a correlation ranking module configured to input the plurality of query-pair vectors into a correlation ranking model, and generate a rank of correlation between the user's query and the paragraphs and/or a correlation between the user's query and the paragraphs; and
a searching resulting generating module configured to determine one or more paragraphs as searching results according to a preset correlation threshold and/or a correlation rank selecting strategy.

G1. The device according to paragraph F1, wherein the extracting features from query-pairs includes:
extracting one or more features of BM25 features, LDA features, and features of semantic correlation between user's query and paragraphs from the query-pairs.

H1. The device according to paragraph G1, wherein the extracting the features of semantic correlation between user's query and paragraphs includes:
converting the user's query and the paragraphs into word vectors, and inputting the word vectors into a deep neural network model so as to generate the features of semantic correlation between the user's query and the paragraphs.

I1. The device according to paragraph F1, wherein in a process of generating the query-pairs, performing comprehensive scoring and ranking on all the found query-pairs with respect to the user's queries by using features for matching, and performing selection according to the ranking result, so as to performing subsequent processing based on the selected query-pairs.

J1. An electronic apparatus including:
a processing unit; and
a memory, coupled to the processing unit and containing instructions stored thereon, the instructions cause the electronic apparatus to perform operations upon being executed by the processing unit, the operations include:
segmenting words of the user's query to generate a plurality of query-words;
acquiring a plurality of paragraphs containing the query-words from the knowledge database according to the query-words respectively, and generating query-pairs consisted of user's query and paragraphs;
extracting features of query-pairs to generate a plurality of query-pair vectors;
inputting the plurality of query-pair vectors into a correlation ranking model, and generating a rank of correlation between the user's query and the paragraphs and/or a correlation between the user's query and the paragraphs; and
determining one or more paragraphs as searching results according to a preset correlation threshold and/or a correlation rank selecting strategy.

K1. The electronic apparatus according to paragraph J1, wherein the extracting features from query-pairs includes:
extracting one or more features of BM25 features, LDA features, and features of semantic correlation between user's query and paragraphs from the query-pairs.

L1. The method according to paragraph K1, wherein the extracting the features of semantic correlation between user's query and paragraphs includes:
converting the user's query and the paragraphs into word vectors, and inputting the word vectors into a deep neural network model so as to generate the features of semantic correlation between the user's query and the paragraphs.

M1. The electronic apparatus according to paragraph J1, wherein in a process of generating the query-pairs, performing comprehensive scoring and ranking on all the found query-pairs with respect to the user's queries by using features for matching, and performing selection according to the ranking result, so as to performing subsequent processing based on the selected query-pairs.

Conclusion

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and nonvolatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes. It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:
1. A device, comprising:
an extracting module configured to extract an entity and a first predicate from a user query;
a predicate searching module configured to search for a plurality of second predicates matched with the entity in a knowledge database according to the entity in the user query;
a predicate selecting module configured to calculate correlations between the first predicate and the plurality of second predicates, and perform selection on the plurality of second predicates according to the correlations to determine one or more third predicates;
a knowledge acquiring module configured to perform searching in the knowledge database based on the third predicate and the entity in the user query to acquire knowledge based data, wherein the knowledge based data is stored in as a triple in the knowledge database; and a word-vector converting module configured to:
extract entities and predicates from a plurality of triples in the knowledge database; and
perform word embedding to convert the extracted entities and the predicates into word vectors, wherein features related to a first context of the predicates from the user query and a second context of the predicates from the knowledge database extracted from the plurality of triples are extracted while converting the entities and the predicates into the word vectors where the correlations are calculated using the word vectors where the first context and the second context have the same objects but different word vectors.

2. The device according to claim 1, wherein the predicate selecting module comprises:
a semantic relevance analyzing module configured to convert the first predicate and the plurality of second predicates into semantic vectors, and perform semantic relevance analyzing to generate a rank of correlations between the plurality of second predicates and the first predicate and/or correlations between the plurality of second predicates and the first predicate; and
a predicate determining module configured to determine one or more third predicates according to a preset correlation threshold and/or a correlation rank selecting strategy.

3. The device according to claim 2, wherein the performing semantic relevance analyzing comprises: performing semantic relevance analyzing based on a neural network model.

4. The device according to claim 1, wherein the device further comprises:
a word-pair recognizing module configured to recognize one or more pairs of words correlated with each other from an input corpus, wherein at least one word in the pair of words is to be used as an entity in the triple;
an implied predicate determining module configured to recognize relationship between the words in the pair of words and determine an implied predicate in the pair of words according to a preset semantic rule of predicates; and
an implicit triple generating module configured to generate the implicit triple based on the implied predicate and the pair of words.

5. The device according to claim 4, further comprising a word-pair selecting module configured to perform selection on the one or more pairs of words according to occurrence rates of the pairs of words, and provide the selected one or more pairs of words to the implied predicate determining module.

6. The device according to claim 1, wherein the device further comprises:
a vector distance calculating module configured to calculate vector distances between the word vectors corresponding to the entities and the predicates in the triples; and
a triple selecting module configured to perform selection on the plurality of triples according to the vector distances.

7. The device according to claim 6, wherein the converting the entities and the predicates into word vectors comprises performing the word embedding based on a neural network on the entities and the predicates in the plurality of triples based on a given corpus to generate word vectors.

8. A method, comprising:
extracting an entity and a first predicate from a user query;
searching for a plurality of second predicates matched with the entity in a knowledge database according to the entity in the user query;
calculating correlations between the first predicate and the plurality of second predicates, and performing selection on the plurality of second predicates according to the correlations to determine one or more third predicates;
performing searching in the knowledge database based on the third predicate and the entity in the user query to acquire knowledge based data, wherein the knowledge based data is stored as a triple in the knowledge database;
extracting entities and predicates from a plurality of triples in the knowledge database; and
performing word embedding to convert the extracted entities and the predicates into word vectors, wherein features related to a first context of the predicates from the user query and a second context of the predicates from the knowledge database extracted from the plurality of triples are extracted while converting the entities and the predicates into the word vectors where the correlations are calculated using the word vectors where the first context and the second context have the same objects but different word vectors.

9. The method according to claim 8, wherein the calculating correlations between the first predicate and the plurality of second predicates, and performing selection on the plurality of second predicates according to the correlations to determine one or more third predicates comprises:
converting the first predicate and the plurality of second predicates into semantic vectors, and performing semantic relevance analyzing to generate a rank of correlations between the plurality of second predicates and the first predicate and/or correlations between the plurality of second predicates and the first predicate; and
determining one or more third predicates according to a preset correlation threshold and/or a correlation rank selecting strategy.

10. The method according to claim 9, wherein the performing semantic relevance analyzing comprises performing semantic relevance analyzing based on a neural network model.

11. The method according to claim 8, wherein the method further comprises extracting implicit triples comprising:
recognizing one or more pairs of words correlated with each other from an input corpus, wherein at least one word in the pair of words is to be used as an entity in the triple;
recognizing relationship between the words in the pair of words and determining an implied predicate in the pair of words according to a preset semantic rule of predicates; and
generating the implicit triple based on the implied predicate and the pair of words.

12. The method according to claim 11, after recognizing the pairs of words correlated with each other, the method further comprises:
performing selection on the one or more pairs of words according to occurrence rates of the pairs of words, and determining the implied predicate according to the selected one or more pairs of words.

13. The method according to claim 8, wherein the method further comprises removing noise from a plurality of extracted triples, and the removing noise from a plurality of extracted triples comprises:

calculating vector distances between the word vectors corresponding to the entities and the predicates in the triples; and performing selection on the plurality of triples according to the vector distances.

14. The method according to claim 13, wherein the converting the entities and the predicates into word vectors comprises performing the word embedding based on a neural network on the entities and the predicates in the plurality of triples based on a given corpus to generate word vectors.

15. An electronic apparatus, comprising:

a processing unit; and a memory, coupled to the processing unit and containing instructions stored thereon, the instructions cause the electronic apparatus to perform operations upon being executed by the processing unit, the operations comprise:

extracting an entity and a first predicate from a user query;

searching for a plurality of second predicates matched with the entity in a knowledge database according to the entity in the user query;

calculating correlations between the first predicate and the plurality of second predicates, and performing selection on the plurality of second predicates according to the correlations to determine one or more third predicates;

performing searching in the knowledge database based on the third predicate and the entity in the user query to acquire knowledge based data, wherein the knowledge based data is stored as a triple in the knowledge database;

extracting entities and predicates from a plurality of triples in the knowledge database; and performing word embedding to convert the extracted entities and the predicates into word vectors, wherein features related to a first context of the predicates from the user query and a second context of the predicates from the knowledge database extracted from the plurality of triples are extracted while converting the entities and the predicates into the word vectors where the correlations are calculated using the word vectors where the first context and the second context have the same objects but different word vectors.

* * * * *